US008244947B2

(12) United States Patent
Shirlen et al.

(10) Patent No.: US 8,244,947 B2
(45) Date of Patent: Aug. 14, 2012

(54) METHODS AND APPARATUS FOR RESOURCE SHARING IN A PROGRAMMABLE INTERRUPT CONTROLLER

(75) Inventors: Martyn Ryan Shirlen, Wake Forest, NC (US); Richard Gerard Hofmann, Cary, NC (US); Michael Egnoah Birenbach, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 694 days.

(21) Appl. No.: 12/389,413

(22) Filed: Feb. 20, 2009

(65) Prior Publication Data

US 2010/0217906 A1  Aug. 26, 2010

(51) Int. Cl.
  *G06F 13/26* (2006.01)
(52) U.S. Cl. ......... 710/264; 710/260; 710/263; 710/265
(58) Field of Classification Search ........... 710/260–269
  See application file for complete search history.

(56) References Cited

U.S. PATENT DOCUMENTS

| | | | | |
|---|---|---|---|---|
| 3,719,930 A * | 3/1973 | Horoshima | ................... | 710/264 |
| 3,949,371 A * | 4/1976 | Pederzini | ........................ | 710/44 |
| 4,734,882 A * | 3/1988 | Romagosa | ..................... | 710/264 |
| 4,908,745 A * | 3/1990 | Ichiyasu et al. | ................ | 700/11 |
| 5,101,199 A * | 3/1992 | Suzuki | ........................... | 370/449 |
| 5,101,497 A * | 3/1992 | Culley et al. | .................... | 710/261 |
| 5,146,595 A * | 9/1992 | Fujiyama et al. | ............. | 710/263 |
| 5,218,703 A * | 6/1993 | Fleck et al. | ................... | 710/264 |
| 5,414,860 A * | 5/1995 | Canova et al. | ................ | 713/340 |
| 5,530,875 A * | 6/1996 | Wach | ............................. | 710/264 |
| 5,539,890 A * | 7/1996 | Rahman et al. | ............... | 710/262 |
| 5,548,762 A * | 8/1996 | Creedon et al. | ............... | 710/260 |
| 5,765,003 A | 6/1998 | MacDonald et al. | | |
| 5,778,236 A * | 7/1998 | Gephardt et al. | ............. | 710/266 |
| 5,968,159 A * | 10/1999 | Mattheis | ....................... | 710/264 |

(Continued)

FOREIGN PATENT DOCUMENTS

EP      0884684 A1    12/1998

OTHER PUBLICATIONS

Ahmad et al. vIC: Interrupt Coalescing for Virtual Machine Storage Device IO. USENIX Annual Technical Conference. Jun. 15, 2011.*

(Continued)

*Primary Examiner* — Matthew D Spittle
(74) *Attorney, Agent, or Firm* — Nicholas J. Pauley; Peter Michael Kamarchik; Jonathan T. Velasco

(57) ABSTRACT

Efficient techniques are described for identifying active interrupt requests to improve performance and reduce power requirements in a processor system. A method to identify active sampled interrupt requests begins with scanning groups of the sampled interrupt requests one group at a time to identify an active interrupt request in any scanned group. A group of interrupt requests is an M/R priority of N sampled interrupt requests, M is the number of priority levels, and R is a resource sharing factor. A group selection circuit is updated to a new group in response to having identified an active interrupt request to improve the latency in processing high priority interrupt requests. Also, groups having active interrupt requests may be identified by early detection or look ahead circuitry. The scanning of groups of interrupt requests may be stopped until the next interrupt request sample point has been reached to reduce power utilization.

20 Claims, 14 Drawing Sheets

U.S. PATENT DOCUMENTS

| | | | |
|---|---|---|---|
| 6,141,703 A * | 10/2000 | Ding et al. ...................... 710/10 |
| 6,263,395 B1 * | 7/2001 | Ferguson et al. ............. 710/262 |
| 6,499,078 B1 * | 12/2002 | Beckert et al. ................ 710/260 |
| 6,539,448 B1 * | 3/2003 | Deng ............................ 710/260 |
| 6,651,126 B1 | 11/2003 | Cantrell et al. |
| 6,772,260 B2 * | 8/2004 | Kawase et al. ................ 710/264 |
| 6,807,595 B2 * | 10/2004 | Khan et al. ................... 710/260 |
| 6,813,666 B2 * | 11/2004 | Joffrain ........................ 710/264 |
| 7,308,518 B2 * | 12/2007 | Matsuyama .................. 710/243 |
| 7,549,005 B1 * | 6/2009 | Pandhare et al. ............. 710/262 |
| 7,606,958 B2 * | 10/2009 | Sasage ......................... 710/260 |
| 7,788,434 B2 * | 8/2010 | Pesavento et al. ............ 710/262 |
| 8,001,309 B2 * | 8/2011 | Patzelt et al. ................. 710/261 |
| 2006/0036792 A1 * | 2/2006 | Chen ............................ 710/264 |

OTHER PUBLICATIONS

Abdelrazek et al. Exception and Interrupt Handling in ARM. 2006.*
Atmel Corporation. AVR32101: Configuring the AVR32 Interrupt Controller. Application Note. 2005.*
International Search Report & Written Opinion—PCT/US2010/024695, International Search Authority—European Patent Office—May 31, 2010.

* cited by examiner

METHODS AND APPARATUS FOR RESOURCE SHARING IN A PROGRAMMABLE INTERRUPT CONTROLLER

FIELD OF THE DISCLOSURE

The present disclosure relates generally to the field of programmable interrupt controllers and, in particular, to prioritized resource sharing interrupt selection logic in a programmable interrupt controller.

BACKGROUND

Many portable products, such as cell phones, laptop computers, personal data assistants (PDAs) and the like, utilize a processing system that executes programs, such as, communication and multimedia programs. A processing system for such portable products may include multiple processors, memory for storing instructions and data, controllers, peripheral devices, such as communication interfaces, and fixed function logic blocks configured, for example, on a single chip. Many of these peripheral devices utilize interrupts to notify an appropriate processor of an event that has occurred or that data is to be transferred between the peripheral device and memory. With processing systems having a large number of functions and associated system elements, a large number of interrupts have to be handled, many of which have to be processed to meet strict real time requirements. With such systems, it becomes increasingly important to efficiently service the large number of interrupts at low power drain to reduce overall energy consumption. Many personal computers are also being developed that utilize a large number of interrupts that must be efficiently serviced to support high performance operations.

In prior systems, relatively few interrupts and a small number of priority levels were generally supported by a programmable interrupt controller that interfaced to a single processor. However, current and planned future systems have grown in complexity causing an increase in the number of interrupts, priority levels, and interfacing processors required to meet product requirements. With this growth in system complexity, the number of interrupts having short or time critical, real time requirements, has also increased.

SUMMARY

Among its several aspects, the present disclosure recognizes that with the number of interrupts increasing, there is an advantage to provide more efficient methods and apparatus for identifying active interrupt requests may improve performance and reduce power requirements in a processor system. To such ends, one embodiment addresses a method to identify active interrupt requests. A group of interrupt requests selected by a group selection circuit is scanned to identify an active interrupt request in any scanned group. The group selection circuit is updated to a new group.

Another embodiment addresses an apparatus for selecting interrupt requests including a group selection circuit, a priority level to interrupt request mapping unit, and a priority level interrupt request selection unit. The group selection circuit generates a sequence of group selection outputs, wherein a group selection output identifies a group of interrupt requests. The priority level to interrupt request mapping unit generates enable signals for interrupt requests belonging to select groups of interrupt requests according to the interrupt requests' assigned interrupt priority levels and the sequence of group selection outputs. The priority level interrupt request selection unit selects one or more active interrupt requests for output in response to the enable signals.

Another embodiment addresses a method for selecting interrupt requests. A sequence of group selection outputs is generated, wherein a group selection output identifies a group of interrupt requests. Enable signals are generated for interrupt requests belonging to select groups of interrupt requests according to the sequence of group selection outputs. One or more active interrupt requests are selected for output in response to the enable signals.

Another embodiment addresses a method to identify an active interrupt request. A highest priority level group is identified as having an active interrupt request from among a plurality of priority level groups of interrupt requests to process the active interrupt request. Priority level groups that do not have an active interrupt request are skipped.

Another embodiment addresses a method for selecting interrupt requests. A group selection output is generated from a pattern generator to identify a group of interrupt requests. The method detects whether there is an active interrupt request in the identified group of interrupt requests. The pattern generator is set to operate in response to a first update clock having a first frequency upon detecting there is an active interrupt request. The pattern generator is set to operate in response to a second update clock having a second frequency upon detecting there is not an active interrupt request, wherein the second frequency is greater than the first frequency.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
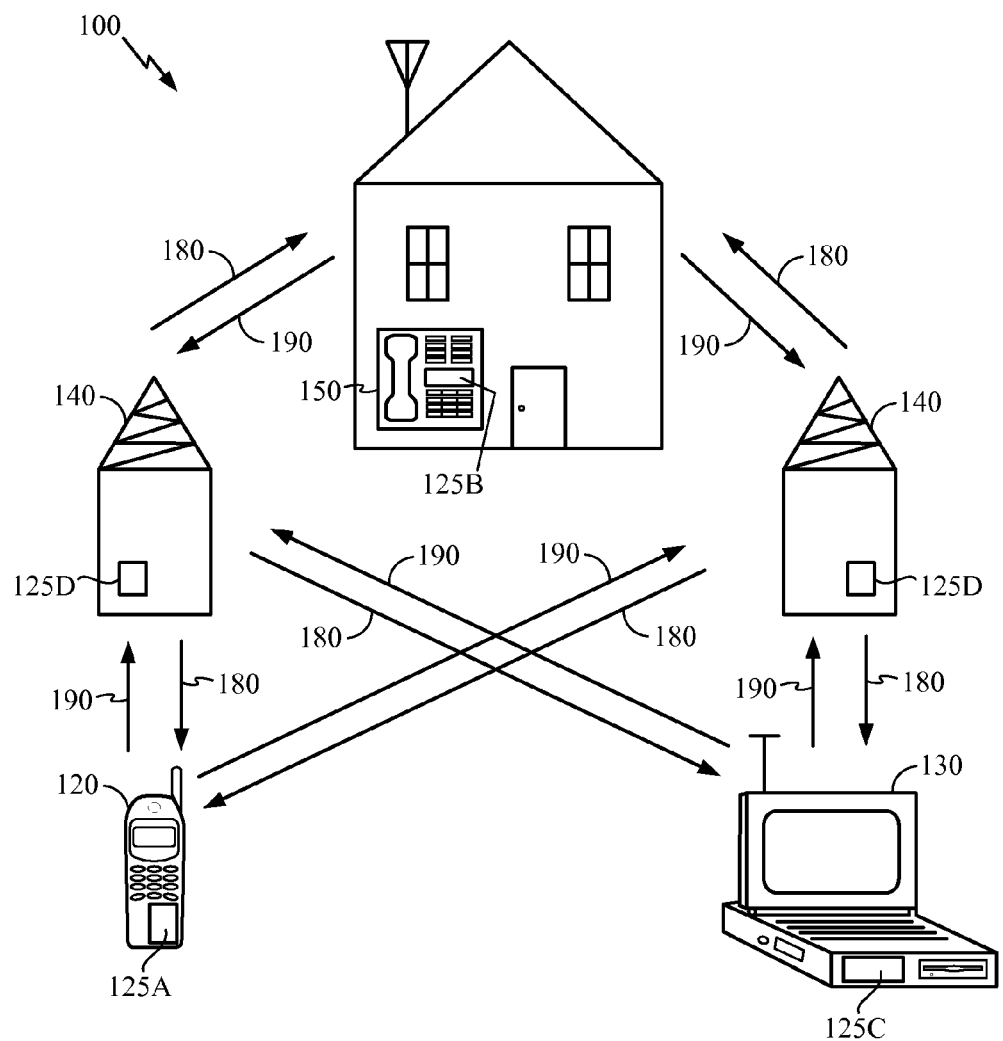
FIG. 1 illustrates a wireless communication system.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication system (PCS) units, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any device having a plurality of interrupts.

Figure 2:
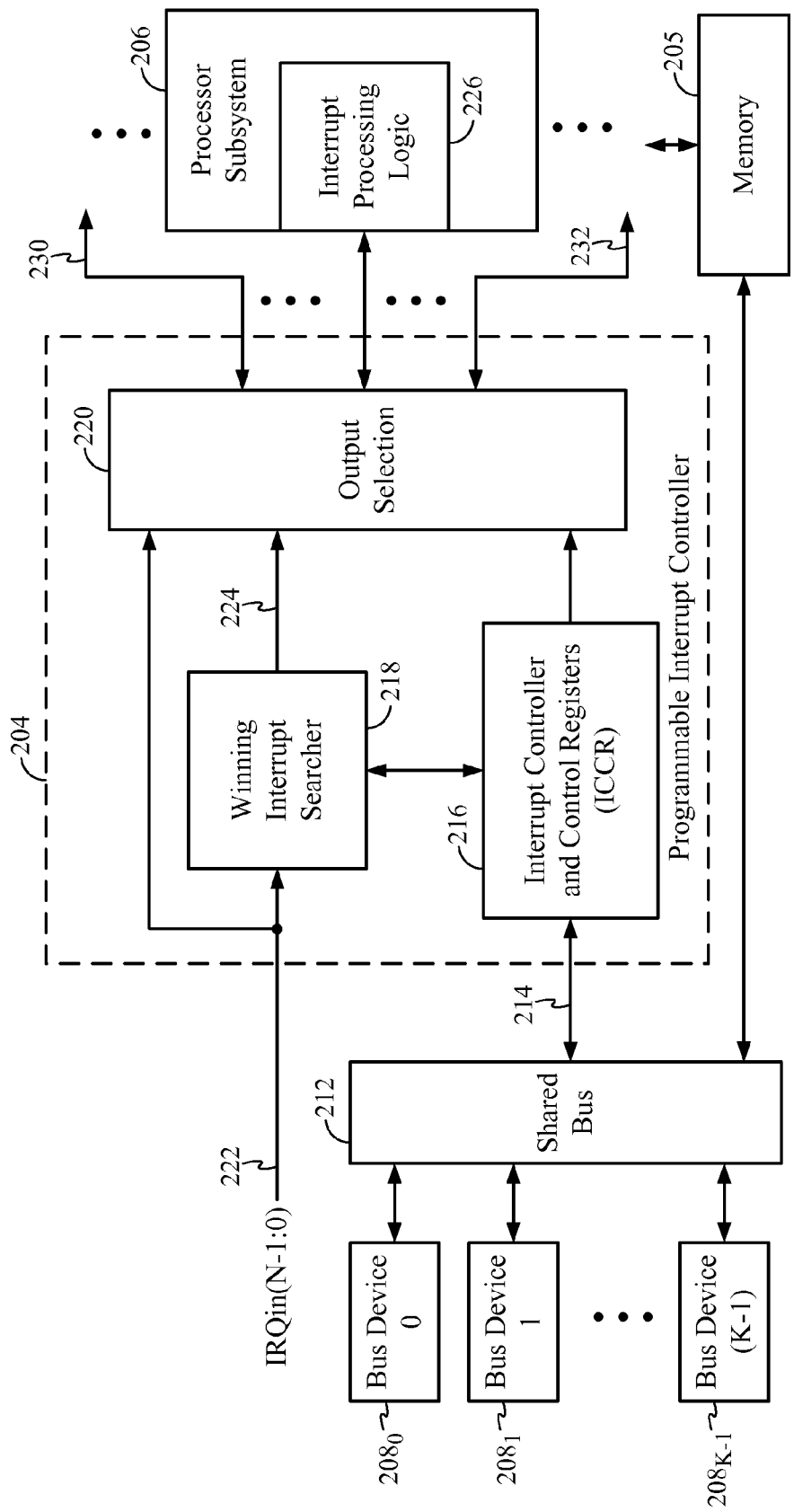
FIG. 2 shows a processing system with a programmable interrupt controller.

FIG. 2 shows a processing system 200 with an exemplary programmable interrupt controller (PIC) 204 which may suitably be employed in components 125A-125D of FIG. 1. The processing system 200 also includes memory 205, processor subsystem 206, which may be one or more of a plurality of processors, and K bus devices $208_0$-$208_{K-1}$. Other system elements, such as peripheral devices, are not shown for reasons of clarity in showing aspects of the PIC 204 in accordance with the present invention. The actual number of processors and bus devices required for a particular application may vary depending upon processing requirements and design constraints.

The shared bus interconnect 212 manages bus traffic, provides connection paths between one or more processors, bus devices and their associated peripheral devices, and memory, and supplies control and data signals 214 to the PIC 204. A bus device, such as a bus master or bus slave, may be a memory controller, a bridge device for interconnecting to another bus interconnect device, a peripheral device such as a hard disk controller, a universal serial bus (USB) controller, an interactive display device, a radio device coupling a controller to a transmitter and receiver, or the like. Bus devices may utilize direct memory access (DMA) techniques for reading or writing data to memory 205. The processing system 200 may be implemented using application specific integrated circuit (ASIC) technology, field programmable gate array (FPGA) technology, or other programmable logic, discrete gate or transistor logic, or any other available technology suitable for an intended application.

The processor subsystem 206, for example, may be configured to execute instructions under control of a program stored on a computer readable storage medium either directly associated locally with the processor, such as memory 205, or accessible through the shared bus interconnect 212 from a bus device. The storage medium may include random access memory (RAM), dynamic random access memory (DRAM), synchronous dynamic random access memory (SDRAM), flash memory, read only memory (ROM), programmable read only memory (PROM), erasable programmable read only memory (EPROM), electrically erasable programmable read only memory (EEPROM), compact disk (CD), digital video disk (DVD), other types of removable disks, or any other suitable storage medium.

The programmable interrupt controller (PIC) 204 comprises an interrupt controller and control register unit (ICCR) 216, a winning interrupt searcher unit 218, and an output selection unit 220. The control and data signal 214 may be utilized to load configuration registers and parameters in the ICCR unit 216 that are required to operate the PIC 204. The configuration registers are used, for example, to specify a priority level for each interrupt, as described in further detail below. The winning interrupt searcher 218 receives interrupt request input (IRQin(N-1:0)) signals 222 from various system components, including peripheral devices, bus devices, and processors. In the winning interrupt searcher 218, the IRQin(N-1:0) signals 222 are sampled, prioritized according to priority levels as programmed in the configuration registers, and the highest priority received interrupt is identified, by an interrupt identification (id) output 224. The interrupt id output 224 is coupled to the output selection unit 220. The output selection unit 220 uses the interrupt id output 224 to identify the associated interrupt, from the IRQin(N-1:0) signals 222. The identified interrupt is coupled to interrupt processing logic circuit 226 of the processor subsystem 206, for example. Interface signals 230 and 232 may be coupled to other interrupt processing logic circuits in a multiprocessor system. For example, an identified interrupt may be broadcast to all processor subsystems or may be selectively distributed to one or more of the processor subsystems in a multiprocessor system.

Figure 3:
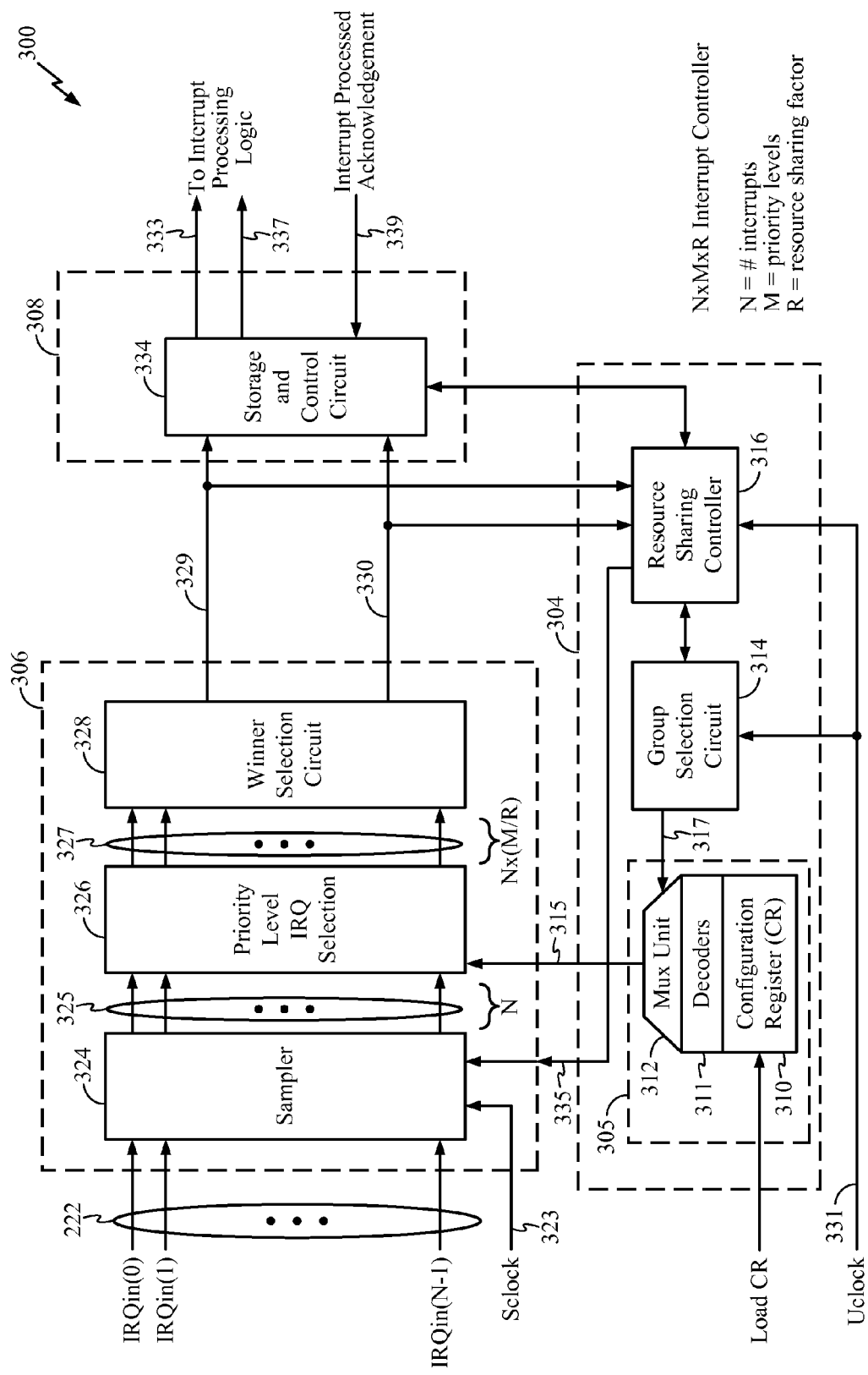
FIG. 3 illustrates a first exemplary N×M×R programmable interrupt controller (PIC) circuit which may suitably be used for the programmable interrupt controller shown in FIG. 2, with N interrupts, M priority levels, and a resource sharing factor R.

FIG. 3 illustrates a first exemplary N×M×R programmable interrupt controller (PIC) circuit 300 which may suitably be used for the programmable interrupt controller 204 shown in FIG. 2, with N interrupts, M priority levels, and a resource sharing factor R. The N×M×R PIC circuit 300 comprises an interrupt controller and control register (ICCR) unit 304, a winning interrupt searcher 306, and an output selection unit 308. The ICCR unit 304 comprises a priority level to interrupt request mapping unit 305 having, for example, a configuration register (CR) 310, decoders 311, and a multiplexer (Mux) unit 312, a group selection circuit 314, and a resource sharing controller 316. The winning interrupt searcher 306 comprises a sampler 324, a priority level IRQ selection unit 326, and a winner selection circuit 328. The output selection unit 308 comprises a storage and control circuit 334.

The N×M×R PIC circuit 300 may be programmed by loading the CR 310 with data values that assign each of the N interrupts, IRQin(N-1:0) 222, with one of the priority levels M, with M=0 being the highest priority and M-1 being the lowest priority. For example, interrupt 0 may be assigned to priority level 0 by programming a binary coded zero data value in the portion of the CR 310 associated with interrupt 0. Interrupt set up software uses knowledge of the interrupt processing hardware and modes of operation to intelligently assign interrupt requests to specific groupings of interrupts at higher or lower priority levels by loading the CR 310 with such assignment based in part on interrupt response time requirements. For example, interrupt requests are assigned to a priority level based on an estimated average time to respond to a priority level interrupt request in a system operating environment. It is also appreciated that the priority levels may be organized in various ways, for example, in a reverse order with the M-1 priority level being the highest priority level and M=0 being the lowest priority. The data values loaded in the CR 310 may also be encoded using different encoding formats, as may be appropriate for a particular implementation. Alternatively, a bit map per group may be loaded in the configuration registers 310 removing the need for decoders 311. The resource sharing factor R may also be programmed into the resource sharing controller 316 or R may be fixed by design.

In operation, the IRQin(N-1:0) signals 222 are sampled at the beginning of every period of a sample clock (Sclock) 323 and stored in the sampler 324 as up to N pending interrupts. The sample clock 323 may be a gated clock or a controlled sampling signal. The sampler 324 outputs N sampled IRQ signals 325 which are coupled to the priority level IRQ selection unit 326. The N sampled IRQ signals 325 are prioritized and scanned in the priority level IRQ selection unit 326 according to their preset priority levels stored in the configuration registers (CR) 310. The encoded data values stored in the CR 310 are decoded by decoders 311 whose output signals are coupled to the Mux unit 312. The Mux unit 312 produces N*(M/R) enable signals 315 that are used to control the priority level IRQ selection unit 326 to select interrupts, for example, in groups of one or more priority levels to produce prioritized and selected pending interrupts 327. The Mux unit 312 selects output signals of the decoders 311 to produce N*(M/R) enable signals 315 in response to a group selection output 317 provided from the group selection circuit 314, as described in further detail below.

In one embodiment, the group selection circuit 314 may be configured as a counter which generates count values. The count values may be used to represent one or more groups of priority levels that are to be scanned for pending interrupts. Also, the group selection circuit 314 group selection output 317 may be updated to the next count value every period of an update clock (Uclock) 331, for example. The update clock 331 may be a gated clock or a controlled update signal. Generally, Uclock 331 has a frequency that is R*frequency of Sclock 323, where R is the resource sharing factor. For example, with a resource sharing factor R of four, the M priority levels are split into M/R=M/4 groups of priority levels with a count value associated with each group of priority levels. In this fashion, the capability is provided to sequence through all of the M priority levels every period of the Sclock 323 by clocking the group selection circuit 314 in synchronism with the Uclock 331. In another embodiment, the group selection circuit 314 may be a pattern generator which generates the group selection output 317 according to a predetermined pattern which may be selectable under program control. Alternatively, and as described in more detail below, the group selection circuit 317 may adaptively generate the group selection output 317 to select groups having one or more active interrupt requests and skip groups not having an active interrupt request.

Advantageously, multiple modes of operating the N×M×R PIC 300 are provided by the resource sharing controller 316. In a first operating mode, N sampled interrupt requests are checked across all of the M priority levels to determine a highest priority interrupt. In a second operating mode, reduced latency is provided for processing high priority interrupts. In a third operating mode, the N×M×R PIC 300 may be operated with low power utilization. In a fourth mode of operation, an early detection circuit controls the group selection circuit 314 to adaptively generate the group selection output 317 to select groups having one or more active interrupt requests and skip groups not having an active interrupt request. In a fifth mode of operation, the sampled interrupt requests are examined and the group selection circuit 314 is loaded with the highest priority group having an active interrupt request thereby adaptively selecting groups based on the order interrupt requests are received. In a sixth mode of operation, the number of priority levels that are checked each Uclock 331 period may be varied. These modes of operations are described in further detail below.

Prioritized and selected pending interrupts 327 are coupled to the winner selection circuit 328. The winner selection circuit 328 selects, among the prioritized and selected pending interrupts 327, the highest priority selected pending interrupt and outputs an encoded interrupt request input (IRQin) identification number (Id) on interrupt Id output 329 to identify the highest priority interrupt. Additional information associated with the winning interrupt, such as, interrupt status or fast interrupt notification, is output on interrupt status 330. The output selection unit 308 receives the interrupt Id output 329 and the interrupt status 330 and saves the state of these signals in the storage and control circuit 334 which may be configured with a first-in-first-out (FIFO) storage device. The storage and control circuit 334 provides a buffered interrupt Id output 333 and buffered interrupt status output 337 coupled to interrupt processing logic, such as the interrupt processing logic 226 of FIG. 2. The interrupt processing logic 226 responds with an interrupt processed acknowledgement signal 339 which initiates clearing the stored state of the selected interrupt output 329 and interrupt status 330. Signal 339 is also used in the resource sharing controller 316 to generate a clear signal 335 to the sampler 324 in the winning interrupt searcher 306 to clear the saved state of the processed interrupt request. Any further pending interrupts held in the sampler 324 may be then processed.

Figure 4:
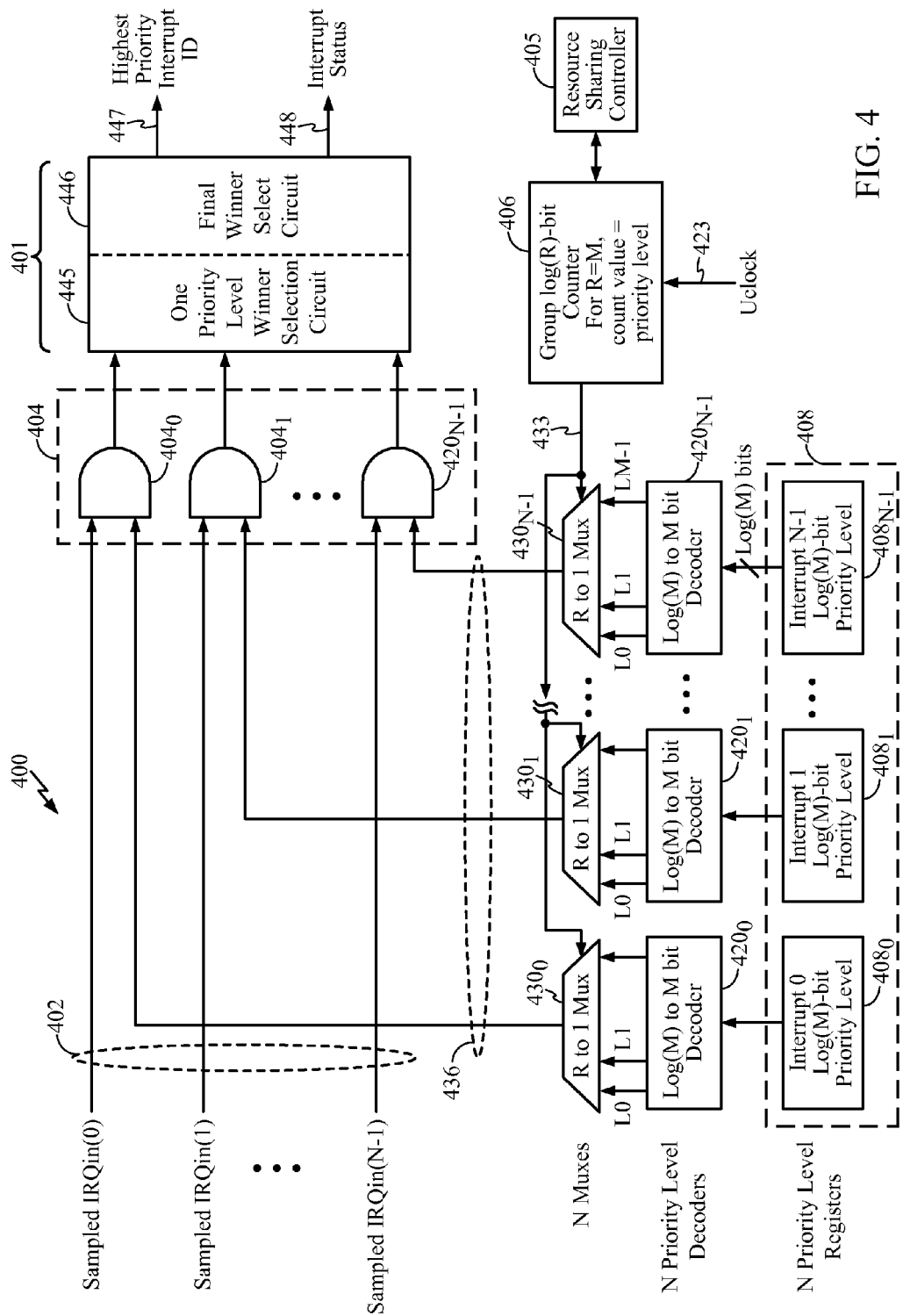
FIG. 4 illustrates a first embodiment of a prioritized interrupt selection circuit with R=M suitable for use in the N×M×R PIC of FIG. 3.

FIG. 4 illustrates a first embodiment of a prioritized interrupt selection circuit 400 with R=M suitable for use in the N×M×R PIC of FIG. 3. The prioritized interrupt selection circuit 400 comprises a winner selection unit 401, a resource sharing circuit 404, a resource sharing controller 405, a group counter 406, a configuration register 408 comprised of N priority level registers $408_0$-$408_{N-1}$, N priority level decoders $420_0$-$420_{N-1}$, and R-to-1 muxes $430_0$-$430_{N-1}$. The prioritized interrupt selection circuit 400 is shown with N sampled interrupt inputs IRQin(N-1:0) 402 received from a sampler, such as sampler 324 of FIG. 3, and with one resource sharing circuit 404. The N interrupts are assigned to priority levels through the use of the configuration register 408. For example, in a system with N interrupts and M priority levels, where N and M are both a power of 2, the priority level may be encoded in log(M)-bits. For N interrupts there are N encoded priority levels that are loaded into the N priority level registers $408_0$-$408_{N-1}$ to assign each of the N interrupts with a priority level. While the circuit 400 of FIG. 4 is based on N and M being a power of 2, the circuit 400 is not so limited and N and M need not be restricted to power of 2 values.

The priority level decoders $420_0$-$420_{N-1}$ decode the priority levels stored in their associated priority level registers $408_0$-$408_{N-1}$ producing M-1 inactive outputs and one active output from each decoder. The one active output from each decoder indicates the priority level for the associated interrupt. The group counter 406 is a log(R)-bit counter that is clocked, for example, by Uclock 423 and controlled by the resource sharing controller 405. The group counter 406 generates multiplexer select signals 433 that are used by the N muxes $430_0$-$430_{N-1}$ to select an output from each of the decoders $420_0$-$420_{N-1}$ to be used as enable signals 436 coupled to AND gates $404_0$-$404_{N-1}$ of the resource sharing circuit 404. The multiplexer select signals 433 correspond to count values of the group counter 406 with each count value, in this example, representing a priority level. A count value of zero would enable priority level L0 and a count value of one would enable priority level L1. The group counter 406 counts through the priority levels until priority level LM-1 is enabled. For example, by loading all zeros into the N priority level registers $408_0$-$408_{N-1}$, all N interrupts are assigned to priority level zero. The group counter 406 having a count value of zero, would generate multiplexer select signals 433 that cause the multiplexers $430_0$-$430_{N-1}$ to select the priority level zero (L0) output of each of the decoder and, for this example, generate N active enable signals 436. Generally, all N interrupts are not mapped to a single priority level, but rather distributed among the M priority levels according to a system priority specification. Other modes of operating the prioritized interrupt selection circuit 400 are described in further detail below. The output of the resource sharing circuit 404 is coupled to the winner selection unit 401 having one internal priority level winner selection circuit 445 and a final winner select circuit 446. The final winner select circuit 446 outputs a highest priority interrupt Id signal 447 and an associated interrupt status signal 448.

Figure 5:
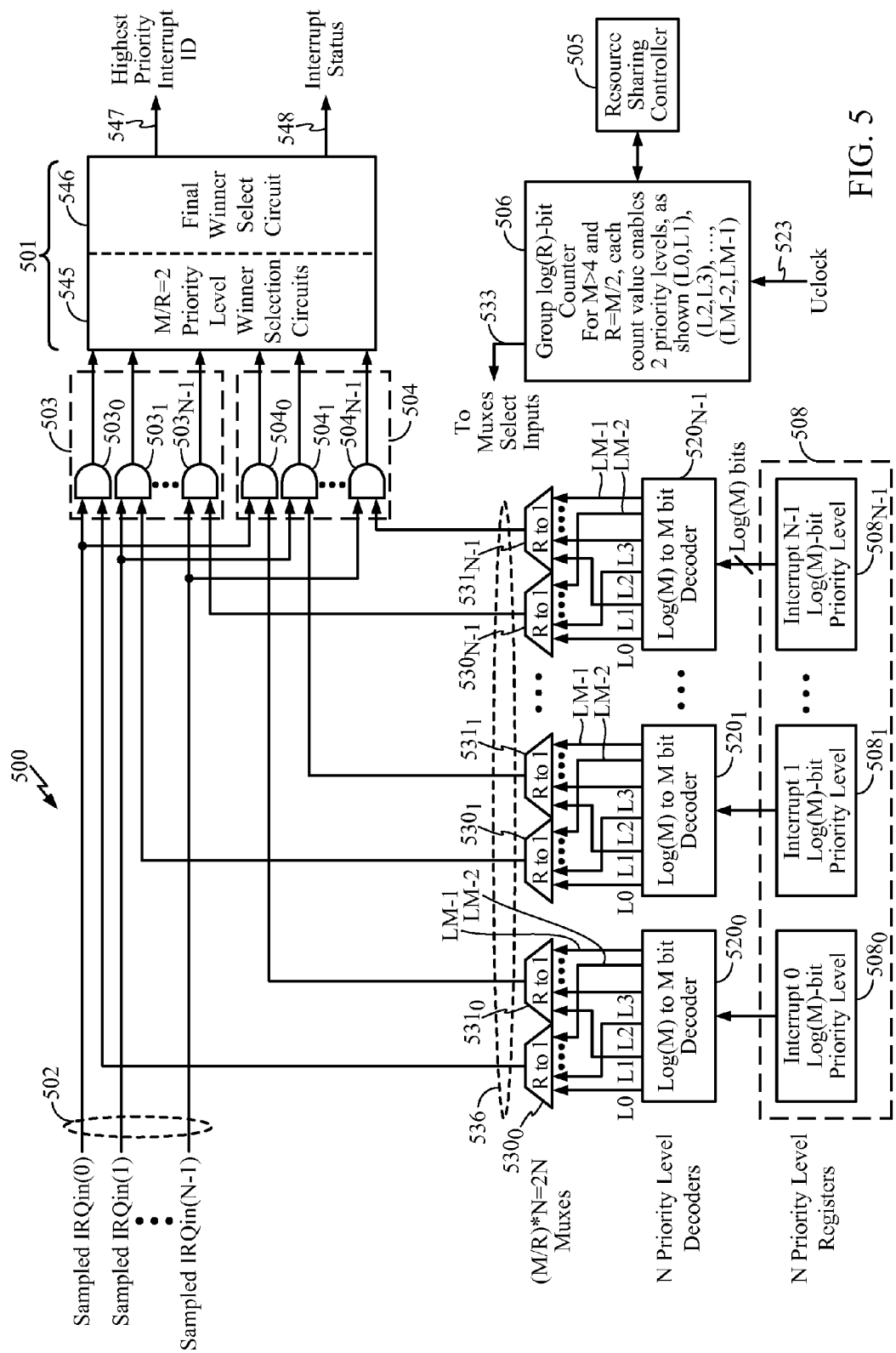
FIG. 5 illustrates a second embodiment of a prioritized interrupt selection circuit with R=M/2 suitable for use in the N×M×R PIC of FIG. 3.

FIG. 5 illustrates a second embodiment of a prioritized interrupt selection circuit 500 with R=M/2 suitable for use in the N×M×R PIC of FIG. 3. The prioritized interrupt selection circuit 500 comprises a winner select unit 501, resource sharing circuits 503 and 504, a resource sharing controller 505, a group counter 506, a configuration register 508 comprised of N priority level registers $508_0$-$508_{N-1}$, N priority level decoders $520_0$-$520_{N-1}$, and R-to-1 muxes $530_0$-$530_{N-1}$ and $531_0$-$531_{N-1}$. The prioritized interrupt selection circuit 500 is shown with N sampled interrupt inputs IRQin(N-1:0) 502 received from a sampler, such as sampler 324 of FIG. 3, and with two resource sharing circuits 503 and 504. The N interrupts are assigned to priority levels through the use of the configuration register 508. For example, in a system with N interrupts and M priority levels, N and M both a power of 2, the priority level may be encoded in log(M)-bits. For N interrupts there are N encoded priority levels that are loaded into the N priority level registers $508_0$-$508_{N-1}$ to assign each of the N interrupts with a priority level. While the circuit 500 of FIG. 5 is based on N and M being a power of 2, the circuit 500 is not so limited and N and M need not be restricted to power of 2 values.

The priority level decoders $520_0$-$520_{N-1}$ decode the priority levels stored their associated priority level registers $508_0$-$508_{N-1}$ producing M-1 inactive outputs and one active output from each decoder. The one active output from each decoder indicates the priority level for the associated interrupt. The group counter 506 is a log(R)-bit counter that is clocked, for example, by Uclock 523 and controlled by the resource sharing controller 505. The group counter 506 generates multiplexer select signals 533 that are used by the R-to-1 muxes $530_0$-$530_{N-1}$ and $531_0$-$531_{N-1}$ to select an output from each of the decoders $520_0$-$520_{N-1}$ to be used as enable signals 536 coupled to AND gates $503_0$-$503_{N-1}$ of the resource sharing circuit 503 and to AND gates $504_0$-$504_{N-1}$ of the resource sharing circuit 504. The multiplexer select signals 533 correspond to count values of the group counter 506 with each count value representing two priority levels. A count value of zero would enable priority levels L0 and L1 and a count value of one would enable priority levels L2 and L3. The counter continues to count until priority levels LM-2 and LM-1 are enabled. For example, by loading either a zero value or a one value into each of the N priority level registers $508_0$-$508_{N-1}$, each of the N interrupts would be assigned to priority level zero or priority level one as loaded into the configuration register 508. The group counter 506 having a count value of zero, would generate multiplexer select signals 533 that cause the multiplexers $530_0$-$530_{N-1}$ to select the priority level zero (L0) output of the decoders $520_0$-$520_{N-1}$ and cause multiplexers $531_0$-$531_{N-1}$ to select the priority level one (L1) output of each of the decoders $520_0$-$520_{N-1}$ and, for this example, generate 2*N active enable signals 536. Generally, all N interrupts are not mapped to one or two priority levels, but rather distributed among the M priority levels according to a system priority specification. Other modes of operating the prioritized interrupt selection circuit 500 are described in further detail below. The outputs of the resource sharing circuits 503 and 504 are coupled to the winner selection unit 501 having two internal priority level winner selection circuits 545 and a final winner select circuit 546. The final winner select circuit 546 outputs a highest priority interrupt Id signal 547 and an associated interrupt status signal 548.

Figure 6:
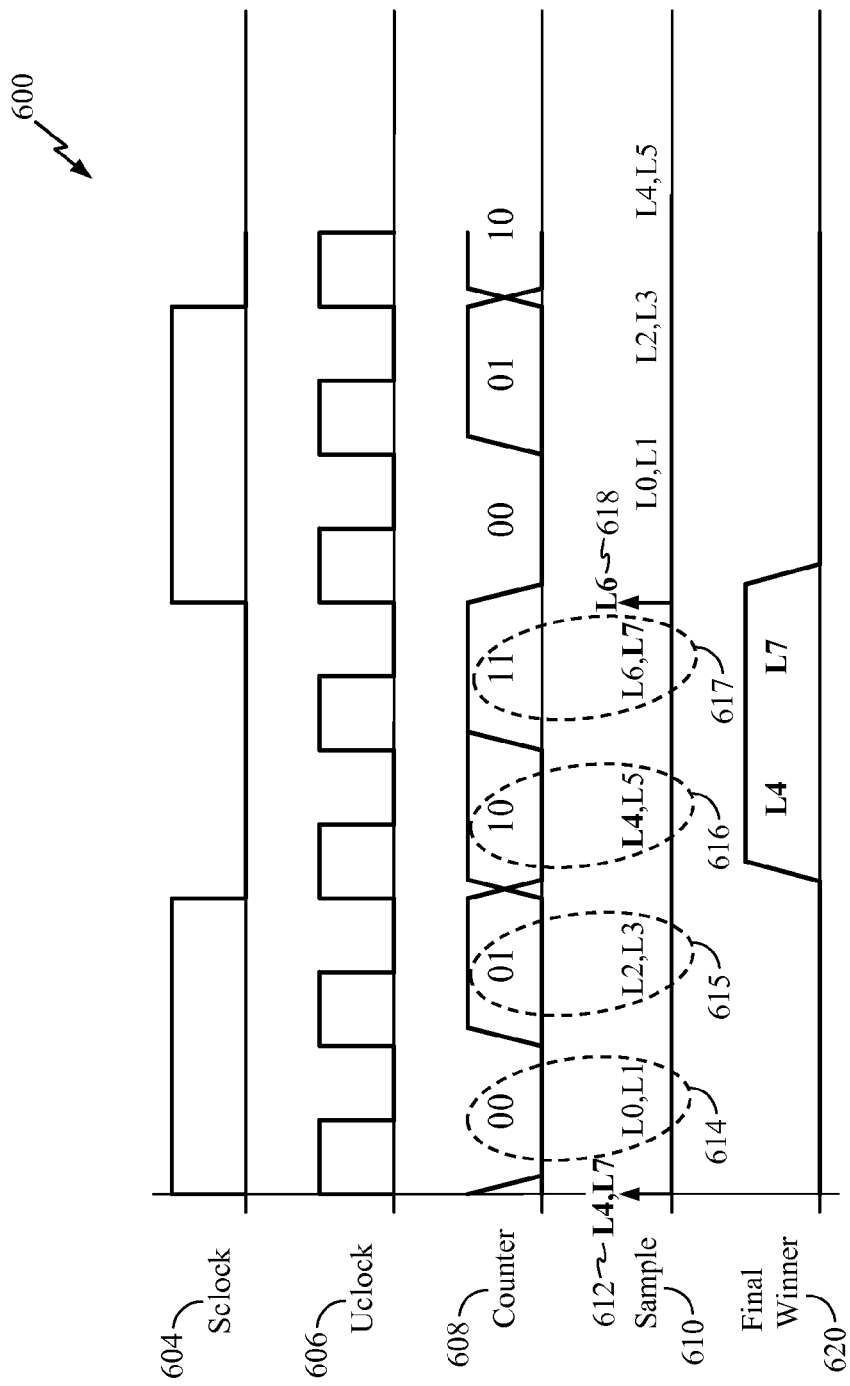
FIG. 6 illustrates an exemplary first timing diagram for a resource sharing interrupt controller using the prioritized interrupt selection circuit of FIG. 5.

FIG. 6 illustrates an exemplary first timing diagram 600 for a resource sharing interrupt controller using the prioritized interrupt selection circuit 500 of FIG. 5. In this example, there are eight priority levels, M=8, and R is equal to M/2=4 with the N×8×4 interrupt controller operating in a first operating mode. Sclock 604 may suitably represent the timing of Sclock 323 of FIG. 3. Uclock 606 may suitably represent the timing of Uclock 523 of FIG. 5. Uclock 606 is shown operating at a frequency that is R=4 times the frequency of Sclock 604. Counter output 608 may suitably represent the timing of group counter 506 multiplexer select signals 533. Counter output 608 sequences through count values representing two priority levels at a time at the sample points indicated by sample point indication 610. The counter output 608, in this example, provides count values that are associated with priority levels, such as, (00=L0,L1), (01=L2,L3), (10=L4,L5), and (11=L6,L7). The sample point indication 610 represents the points in time the N interrupts, such as IRQin(N-1:0) 222 of FIG. 3, are sampled in synch with the rising edge of Sclock 604 in a sampler, such as sampler 324 of FIG. 3.

At the first sample point 612, a priority level 4 (L4) interrupt and a priority level 7 (L7) interrupt are active and sampled. With the group counter 506 at a first count value (0,0) 614, priority levels L0 and L1 inputs to the muxes $530_0$-$530_{N-1}$ and $531_0$-$531_{N-1}$ are selected. Any sampled active interrupt that was assigned to priority levels L0 or L1 would be enabled to pass through the resource sharing circuits 503 and 504. Since in this example no active L0 or L1 interrupts were sampled, the group counter 506 is updated to a second count value (0,1) 615. At the second count value (0,1) 615, priority levels L2 and L3 inputs to the muxes $530_0$-$530_{N-1}$ and $531_0$-$531_{N-1}$ are selected. Any interrupt active that was assigned to priority levels L2 or L3 would be enabled to pass through the resource sharing circuits 503 and 504. Since in this example no active L2 or L3 interrupts were sampled, the group counter 506 is updated to a third count (1,0) value 616. At the third count value (1,0) 616, priority levels L4 and L5 inputs to the muxes $530_0$-$530_{N-1}$ and $531_0$-$531_{N-1}$ are selected. Any active interrupt that was assigned to priority levels L4 or L5 would be enabled to pass through the resource sharing circuits 503 and 504. Since in this example, there is an active L4 interrupt that was sampled, that particular L4 interrupt is passed through the resource sharing circuit 503 to one of the two internal priority level winner selection circuits 545. Since the priority level L4 interrupt is the highest priority level interrupt identified at this point in the count sequence, the final winner selection circuit 546 outputs a final winner 620 identifying, at this time, the highest priority interrupt as the L4 interrupt.

Figure 7:
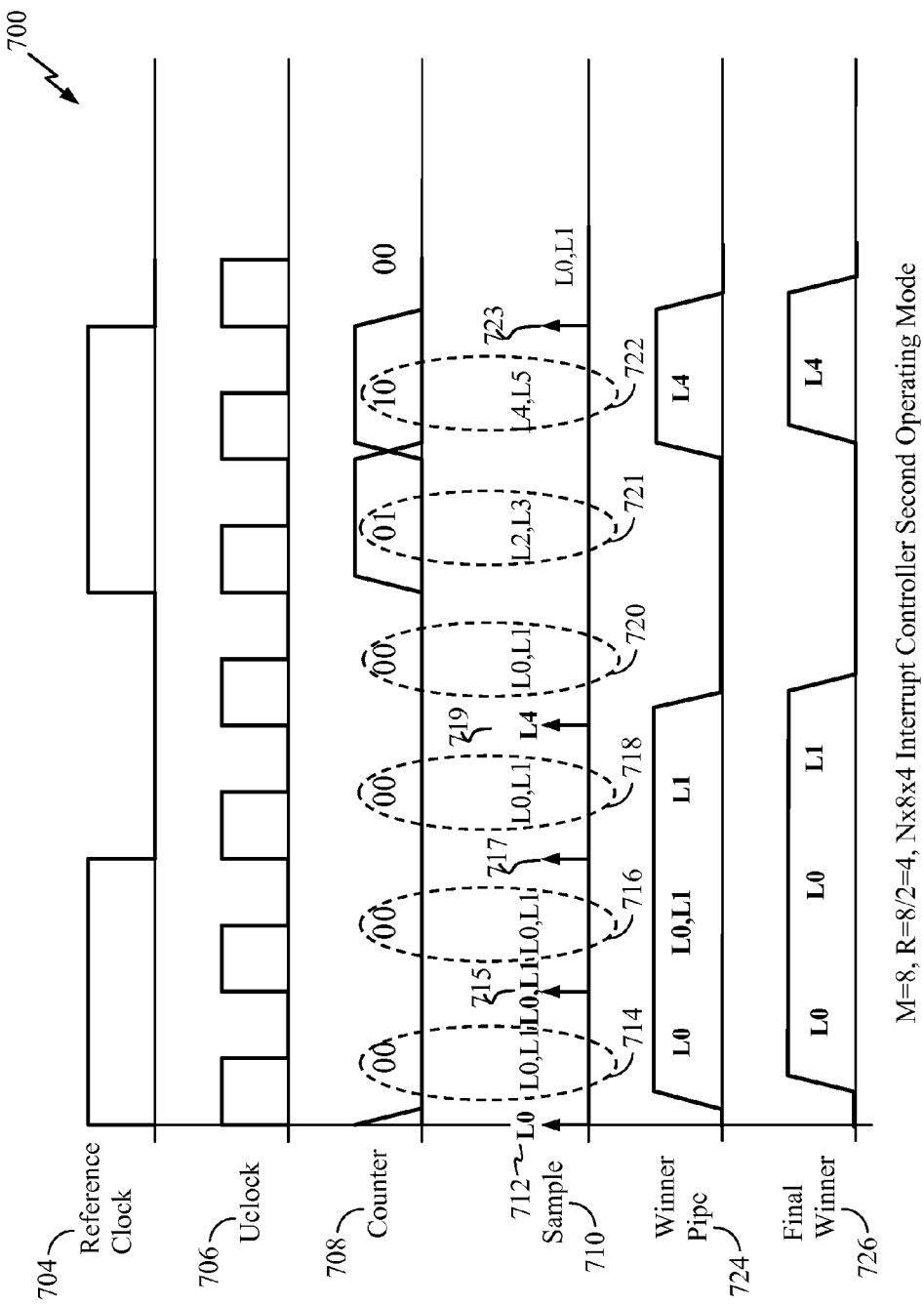
FIG. 7 illustrates an exemplary second timing diagram for a reduced latency interrupt controller using the prioritized interrupt selection circuit of FIG. 5.

In this first operating mode, the group counter 506 is updated to a fourth count (1,1) value 617. At the fourth count value (1,1) 617, priority levels L6 and L7 inputs to the muxes $530_0$-$530_{N-1}$ and $531_0$-$531_{N-1}$ are selected. Any active interrupt that was assigned to priority levels L6 or L7 would be enabled to pass through the resource sharing circuits 503 and 504. Since in this example, there is an active L7 interrupt that was sampled, that particular L7 interrupt is passed through the resource sharing circuit 504 to one of the two internal priority level winner selection circuits 545. Since the priority level L7 interrupt is the highest priority level interrupt identified at this point in the count sequence, the final winner selection circuit 546 outputs a final winner 620 identifying, at this time, the highest priority interrupt as the L7 interrupt. The group counter 506 then wraps back to the initial count value (0,0) and the process continues. In the first operating mode, N sampled interrupt requests are checked across all of the M priority levels to determine a highest priority interrupt FIG. 7 illustrates an exemplary timing diagram 700 for a reduced latency interrupt controller using the prioritized interrupt selection circuit 500 of FIG. 5. In this example, there are eight priority levels, M=8, and R is equal to M/2=4 with the N×8×4 interrupt controller operating in a second operating mode to provide reduced latency sampling of the highest priority interrupts. Reference clock 704 is provided for timing reference purposes. Uclock 706 may suitably represent the timing of Uclock 523 of FIG. 5. Uclock 706 is shown operating at a frequency that is R=4 times the frequency of the reference clock 704. Counter output 708 may suitably represent the timing of group counter 506 multiplexer select signals 533. Counter output 708 sequences through counts representing two priority levels at a time at the sample points indicated by sample point indication 710. The counter output 708, in this example, provides count values that are associated with priority levels, such as, (00=L0,L1), (01=L2,L3), (10=L4,L5), and (11=L6,L7). The sample point indication 710 represents the points in time the N interrupts, such as IRQin(N-1:0) 222 of FIG. 3, are sampled dependent upon whether interrupts were previously detected and, for example, in synch with rising edges of Uclock 706. To support a reduced latency interrupt controller, real-time event interrupts are assigned to the highest priority level, for example, interrupt priority levels zero and one. Less time-critical interrupts may be assigned to lower priority levels.

At the first sample point 712, a priority level 0 (L0) interrupt is active and sampled. With the group counter 506 at a count value (0,0) 714, priority levels L0 and L1 inputs to the muxes $530_0$-$530_{N-1}$ and $531_0$-$531_{N-1}$ are selected. Any sampled active interrupt that was assigned to priority levels L0 or L1 would be enabled to pass through the resource sharing circuits 503 and 504. If a lower priority interrupt was also sampled at sample point 712, it would be held in a pending state. Since in this example, there is an active L0 interrupt that was sampled, that particular L0 interrupt is passed through the resource sharing circuit 503 to one of the two internal priority level winner selection circuits 545. Since the priority level L0 interrupt is the highest priority level interrupt identified at this point in the count sequence, the final winner selection circuit 546 outputs a final winner 620 identifying, at this time, the highest priority interrupt as the L0 interrupt.

In this second operating mode, the L0 interrupt is received, for example, by interrupt processing logic 226 of FIG. 2, for further processing and an acknowledgment is returned to the interrupt controller. In the second operating mode, the interrupt controller is reset to select the first group and new interrupts are sampled. At sample point 715, a new priority level L0 interrupt and a priority level L1 interrupt are active and sampled. With the group counter 506 maintained at a count value (0,0) 716, priority levels L0 and L1 inputs to the muxes $530_0$-$530_{N-1}$ and $531_0$-$531_{N-1}$ are selected. Since in this example, there are an active L0 interrupt and an active L1 interrupt, the identified L0 interrupt is passed through the resource sharing circuit 503 and the identified L1 interrupt is passed through the resource sharing circuit 504 to the two internal priority level winner selection circuits 545. Since the priority level L0 interrupt is the highest priority level interrupt identified at this point, the final winner selection circuit 546 outputs a final winner 620 identifying, at this time, the highest priority interrupt as the L0 interrupt. After receiving an acknowledgement of the L0 interrupt from the interrupt processing logic, the interrupt requests are sampled at sample point 717 with the group counter 506 being reset to or maintained at a count value (0,0) 718. Since no new interrupts are active, the pending L1 interrupt is selected for output.

After the high priority L1 interrupt has been acknowledged, the interrupt controller samples the interrupts at sample point 719, which samples an active L4 interrupt. The group counter begins at a count value (0,0) 720. Since at sample point 719 no active L0 or L1 interrupts were sampled, the resource sharing counter is updated to a new count value (0,1) 721. At the new count value (0,1) 721, priority levels L2 and L3 inputs to the muxes $530_0$-$530_{N-1}$ and $531_0$-$531_{N-1}$ are selected. Any interrupt active that was assigned to priority levels L2 or L3 would be enabled to pass through the resource sharing circuits 503 and 504. Since in this example no active L2 or L3 interrupts were sampled, the group counter is updated to a new count (1,0) value 722. At the new count value (1,0) 722, priority levels L4 and L5 inputs to the muxes $530_0$-$530_{N-1}$ and $531_0$-$531_{N-1}$ are selected. Any active interrupt that was assigned to priority levels L4 or L5 would be enabled to pass through the resource sharing circuits 503 and 504. Since at sample point 719, there is an active L4 interrupt that was sampled, that particular L4 interrupt is passed through the resource sharing circuit 503 to one of the two internal priority level winner selection circuits 545. Since the priority level L4 interrupt is the highest priority level interrupt identified at this point in the count sequence, the final winner selection circuit 546 outputs a final winner 726 identifying, at this time, the highest priority interrupt as the L4 interrupt. After receiving an acknowledgement for the L4 interrupt, the interrupt requests are sampled at sample point 723 and the group counter 506 is reset to the beginning count value (0,0). The second operating mode allows a reduced latency for sampling and processing high priority interrupts.

Figure 8:
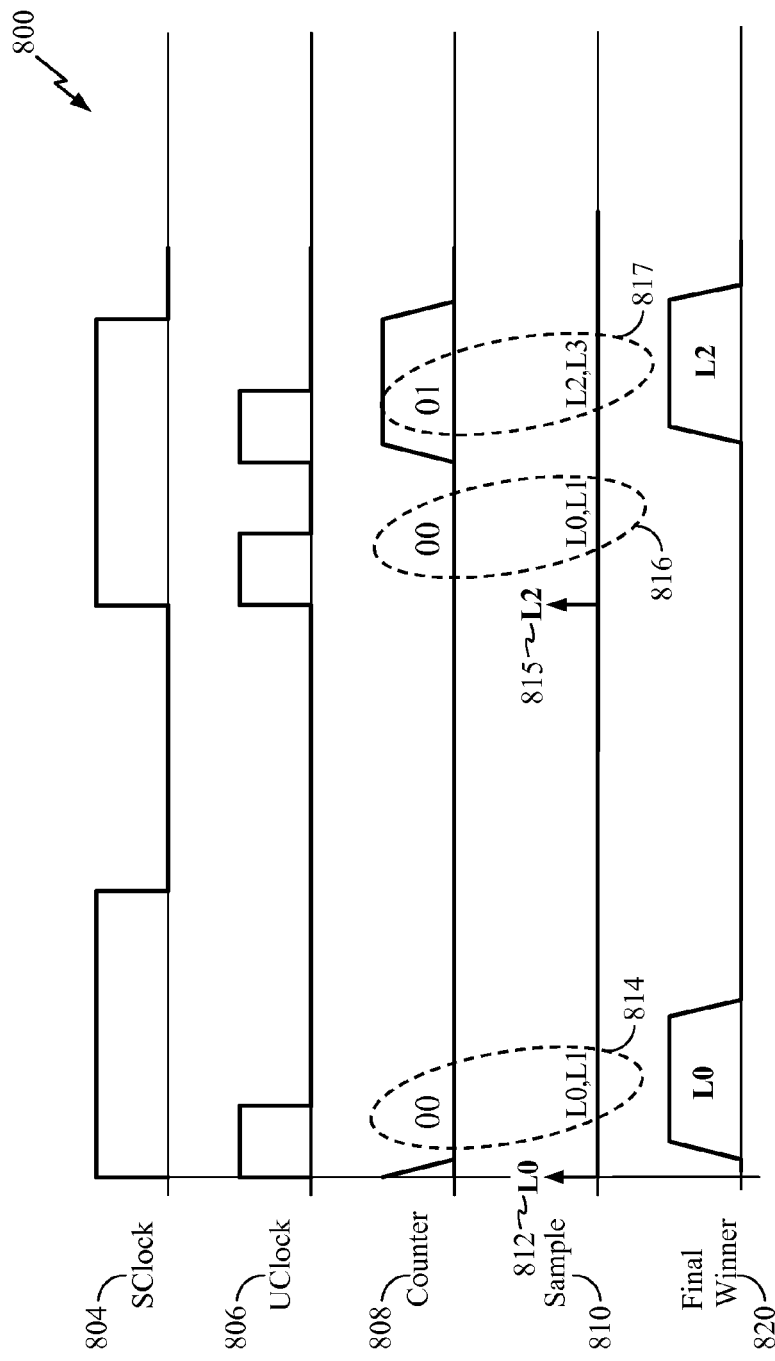
FIG. 8 illustrates an exemplary third timing diagram for power saving operations on the prioritized interrupt selection circuit of FIG. 5.

FIG. 8 illustrates an exemplary timing diagram 800 for power saving operations on the prioritized interrupt selection circuit 500 of FIG. 5. In this example, there are eight priority levels, M=8, and R is equal to M/2=4 with the N×8×4 interrupt controller operating in a third operating mode to provide power saving operation of the interrupt controller. For the third operating mode, interrupts may be assigned such that high priority interrupts are assigned to priority level L0. The assigned high priority L0 interrupts may be able to be sampled at a Sclock 804 rate and still meet system requirements. Further, the interrupt controller may be set inactive after sampling a high priority L0 interrupt. When the interrupt controller is in an inactive state, the processing of any pending lower priority interrupts is delayed until the next Sclock period. If no active L0 interrupt has been sampled, lower priority interrupts are processed as required to meet system requirements. In another embodiment, the interrupt controller may be set inactive after servicing any highest priority level interrupt holding processing of pending interrupt requests to the next clock period. Sclock 804 may suitably represent the timing of Sclock 323 of FIG. 3. Uclock 806 may suitably represent the timing of Uclock 523 of FIG. 5. Uclock 806 may be a gated clock that operates at a frequency that is R=4 times the frequency of Sclock 804 when Uclock 806 is not inactive for power saving reasons. Counter output 808 may suitably represent the timing of group counter 506 multiplexer select signals 533. Counter output 808 sequences through count values representing two priority levels at a time at the sample points indicated by sample point indication 810. The counter output 808, in this example, provides count values that are associated with priority levels, such as, (00=L0,L1), (01=L2, L3), (10=L4,L5), and (11=L6,L7). The sample point indication 810 represents the points in time the N interrupts, such as IRQin(N-1:0) 222 of FIG. 3, are sampled in a sampler, such as sampler 324 of FIG. 3, dependent upon whether interrupts were previously detected and, for example, in synch with rising edges of Sclock 804.

At the first sample point 812, a priority level 0 (L0) interrupt is active and sampled. With the group counter 506 at a count value (0,0) 814, priority levels L0 and L1 inputs to the muxes $530_0$-$530_{N-1}$ and $531_0$-$531_{N-1}$ are selected. Since in this example, there is an active L0 interrupt that was sampled, that particular L0 interrupt is passed through the resource sharing circuit 503 to one of the two internal priority level winner selection circuits 545. Since the priority level L0 interrupt is the highest priority level interrupt identified at this point in the count sequence, the final winner selection circuit 546 outputs a final winner 820 identifying, at this time, the highest priority interrupt as the L0 interrupt. After receiving an acknowledgement for the L0 interrupt, the interrupt controller is set inactive, which may include gating Uclock 806 off thereby stopping operation of the group counter 506, the muxes $530_0$-$530_{N-1}$ and $531_0$-$531_{N-1}$, the resource sharing circuits 503 and 504, and the winner selection unit 501.

At a second sample point 815, a priority level 2 (L2) interrupt is active and sampled. Uclock 806 resumes clocking and the group counter 506 resumes operation. With the group counter 506 reset to a count value (0,0) 816, priority levels L0 and L1 inputs to the muxes $530_0$-$530_{N-1}$ and $531_0$-$531_{N-1}$ are selected. Since there are no active L0 or L1 interrupts, the counter is updated to a new count value (0,1) 817. Priority levels L2 and L3 inputs to the muxes $530_0$-$530_{N-1}$ and $531_0$-$531_{N-1}$ are selected. Since the priority level L2 interrupt is the highest priority level interrupt identified at this point in the count sequence, the final winner selection circuit 546 outputs a final winner 820 identifying, at this time, the highest priority interrupt as the L2 interrupt. After receiving an acknowledgement for the L2 interrupt, the interrupt controller is set inactive, which includes gating Uclock 806 off thereby stopping operation of the group counter 506, the muxes $530_0$-$530_{N-1}$ and $531_0$-$531_{N-1}$, the resource sharing circuits 503 and 504, and the winner selection unit 501. The third operating mode provides power saving operations of the interrupt controller.

Figure 9:
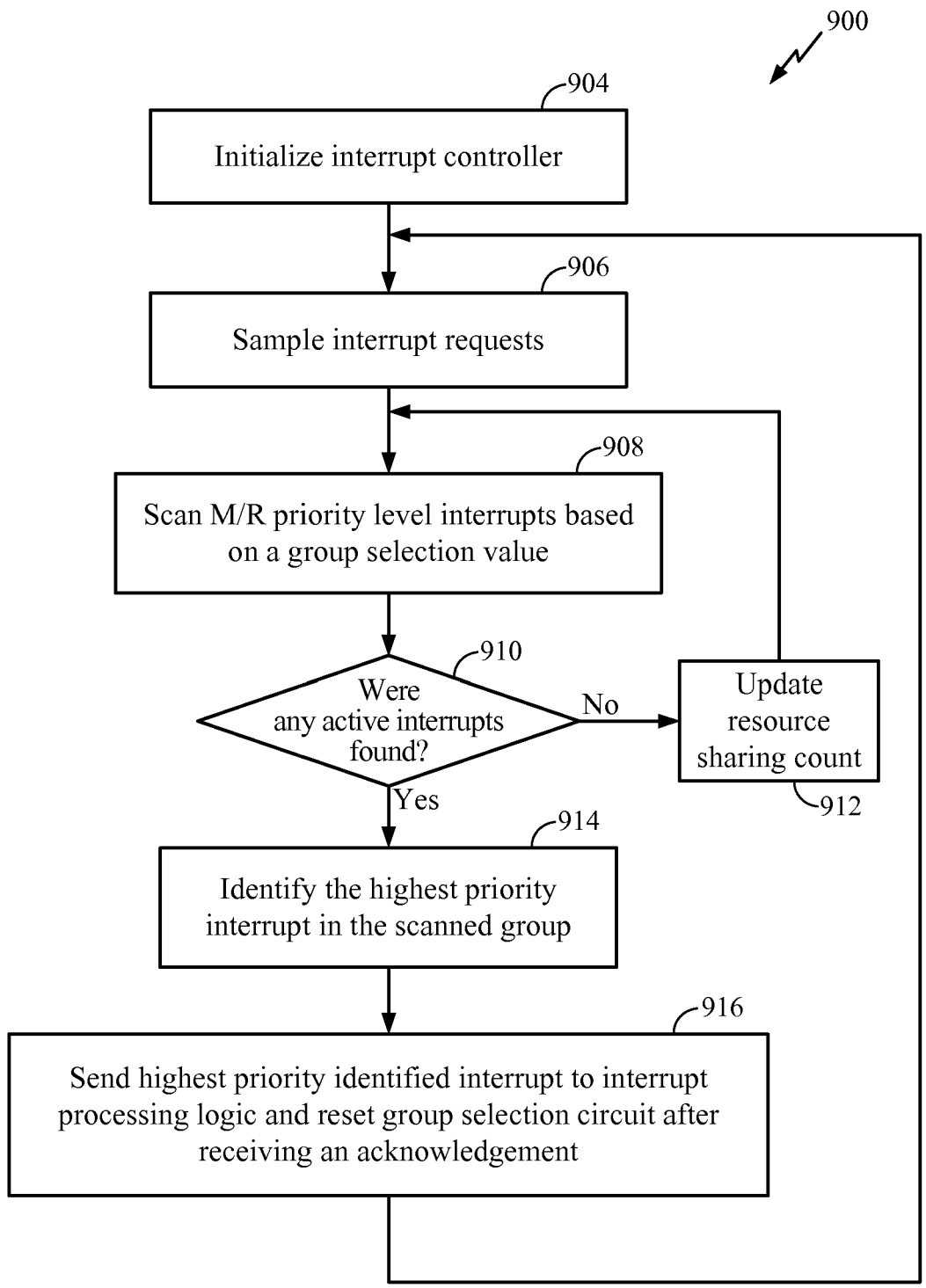
FIG. 9 illustrates an exemplary first interrupt process for a reduced latency interrupt controller.

FIG. 9 illustrates an exemplary first interrupt process 900 for a reduced latency interrupt controller. At block 904, the interrupt controller is initialized, which may include, resetting a group counter, such as group counter 506, to an initial count value representing the highest priority group of priority levels. The initialization may also include loading the configuration registers to map interrupts to priority levels. At block 906, interrupt requests are sampled. At block 908, a number of priority levels M divided by resource sharing factor R (M/R) priority level interrupts are scanned based on a group selection value, for example, from the group counter. At decision block 910, a determination is made whether any active interrupts were found. If no active interrupts were identified in the M/R scanned group, the first interrupt process 900 proceeds to block 912. At block 912, the group counter is updated to the next count value and the first interrupt process 900 proceeds to block 908 to scan the next M/R group of priority level interrupts. If active interrupts were identified at decision block 910, the first interrupt process 900 proceeds to block 914. At block 914, the highest priority interrupt is identified in the scanned group of M/R priority level interrupts. At block 916, the highest priority identified interrupt is sent to interrupt processing logic, acknowledged, and the group selection circuit is reset. For example, the group counter 506 is reset to the initial count value. The first interrupt process 900 proceeds to block 906 to sample the incoming interrupt requests with any previously sampled lower priority interrupt requests kept pending. Further, a process to preclude interrupt starvation or loss of any pending interrupts may also be included in the first interrupt process 900.

Figure 10:
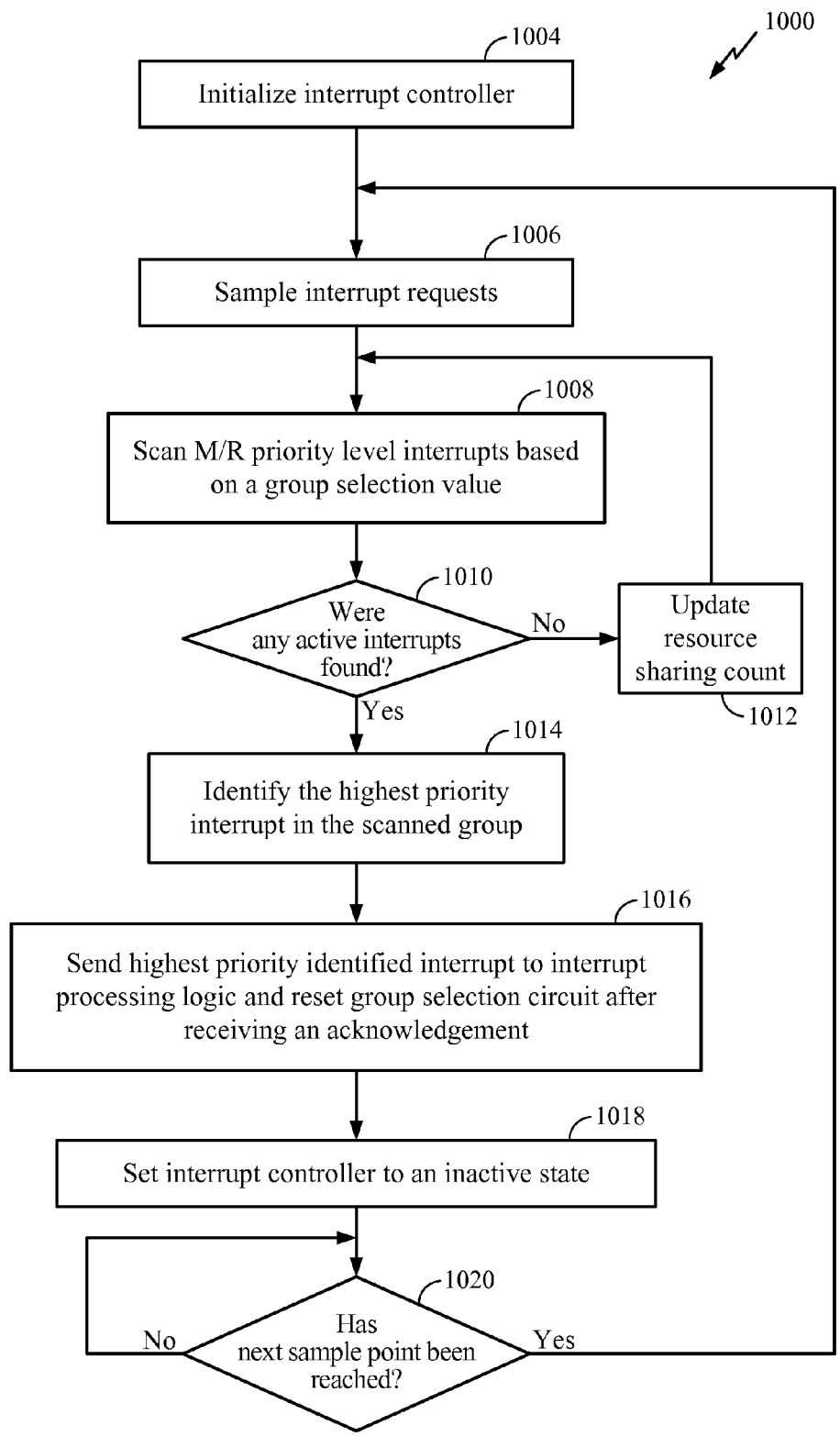
FIG. 10 illustrates an exemplary second interrupt process for a power savings interrupt controller.

FIG. 10 illustrates an exemplary second interrupt process 1000 for a power savings interrupt controller. At block 1004, the interrupt controller is initialized, which may include, resetting a group selection circuit, such as group counter 506, to an initial count value representing the highest priority group of priority levels. The initialization may also include loading the configuration registers to map interrupts to priority levels. Also, a parameter may be loaded to specify the count value of the group counter or priority level that may trigger placing the interrupt controller in an inactive state. At block 1006, interrupt requests are sampled. At block 1008, a total number of priority levels M divided by resource sharing factor R (M/R) priority level interrupts are scanned based on the count value from the group counter. At decision block 1010, a determination is made whether any active interrupts were found. If no active interrupts were identified in the M/R scanned group, the second interrupt process 1000 proceeds to block 1012. At block 1012, the group counter count value is updated to the next count value and the second interrupt process 1000 proceeds to block 1008 to scan the next M/R group of priority level interrupts. If active interrupts were identified at decision block 1010, the second interrupt process 1000 proceeds to block 1014. At block 1014, the highest priority interrupt is identified in the scanned group of M/R priority level interrupts. At block 1016, the highest priority identified interrupt is sent to interrupt processing logic and the group selection circuit is rest after receiving an acknowledgement. At block 1018, the interrupt controller may be set inactive to save power. At decision block 1020, a determination is made as to whether the next sample point has been reached. If the next sample point has not been reached, the second interrupt process 1000 waits until the sample point has been reached. When the next sample point is reached, the second interrupt process 1000 proceeds to block 1006. Further, a process to preclude interrupt starvation or loss of any pending interrupts may also be included in the second interrupt process 1000.

Figure 11:
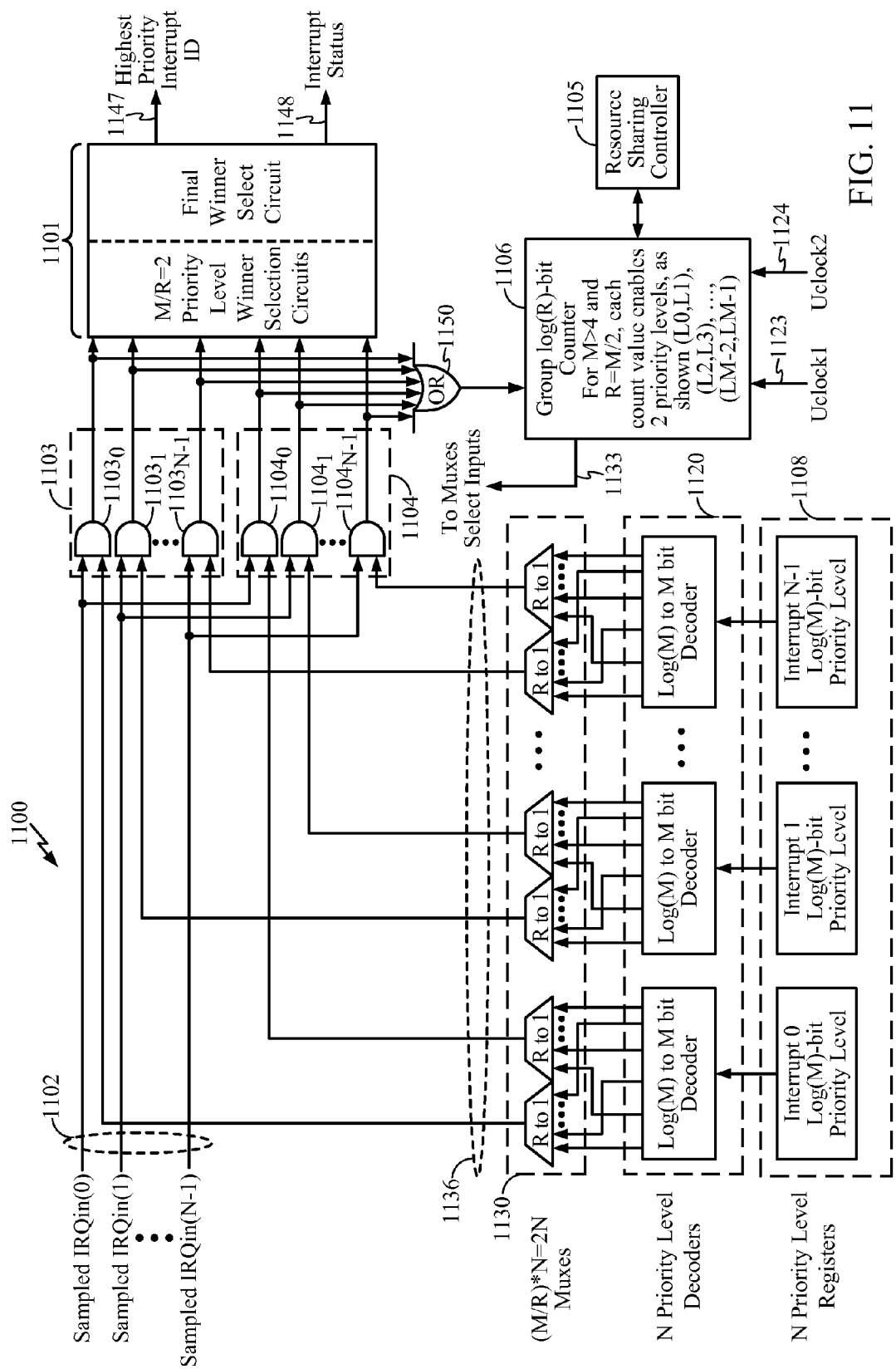
FIG. 11 illustrates a third embodiment of a prioritized interrupt selection circuit operating in a fourth operating mode for a reduced latency interrupt controller.

FIG. 11 illustrates a third embodiment of a prioritized interrupt selection circuit 1100 operating in a fourth operating mode. The prioritized interrupt selection circuit 1100 comprises a winner select unit 1101, resource sharing circuits 1103 and 1104, a resource sharing controller 1105, a pattern generator or group counter 1106, a configuration register 1108, priority level decoder 1120, multiplexer 1130, and an early detection circuit logically shown as an OR gate 1150. The prioritized interrupt selection circuit 1100 is shown with N sampled interrupt inputs IRQin(N-1:0) 1102 received from a sampler, such as sampler 324 of FIG. 3, and with two resource sharing circuits 1103 and 1104. The N interrupts are assigned to priority levels through the use of the configuration register 1108.

The priority level decoder 1120 decode the priority levels stored their associated configuration register 1108 producing M-1 inactive outputs and one active output from each internal decoder. The one active output from each of the internal decoders indicates the priority level for the associated interrupt. The group counter 1106 is a log(R)-bit counter that is clocked, for example, by a first update clock (Uclock1) 1123 and by a second update clock (Uclock2) 1124, as described in more detail below. The group counter 1106 is controlled by the resource sharing controller 1105. The group counter 1106 generates multiplexer select signals 1133 that are used by the multiplexer 1130 to select an output from each of the internal decoders to be used as enable signals 1136 coupled to AND gates 1103$_0$-1103$_{N-1}$ of the resource sharing circuit 1103 and to AND gates 1104$_0$-104$_{N-1}$ of the resource sharing circuit 1104. The multiplexer select signals 1133 correspond to count values of the group counter 1106 with each count value, in this case, representing two priority levels. A count value of zero would enable priority levels L0 and L1 and a count value of one would enable priority levels L2 and L3.

With an interrupt request detected in either priority levels L0 or L1, the group counter 1106 may be updated by the Uclock1 1123 or by the Uclock2 1124 depending upon the operating mode. In one embodiment, Uclock2 1124 operates at a higher frequency than Uclock1 1123. For example, in the first operating mode the group counter 1106 could be updated by Uclock1 1123 providing similar timing to that shown in the timing diagram 600 of FIG. 6. Alternatively, in the fourth mode of operation, the early detection circuit OR gate 1150 controls the group counter 1106 to adaptively generate the multiplexer select signals 1133 to select groups having one or more active interrupt requests and skip groups not having an active interrupt request. In the fourth operating mode, the group counter 1106 would be updated by Uclock2 1124 in response to the early detection circuit OR gate 1150 indicating there are no active sampled interrupt request. With Uclock2 1124 operating at a higher frequency than Uclock1 1123, the latency between processing active sampled interrupt requests is reduced.

The outputs of the resource sharing circuits 1103 and 1104 are coupled to the winner selection unit 1101 which outputs a highest priority interrupt Id signal 1147 and an associated interrupt status signal 1148. When the early detection circuit OR gate 1150 indicates an active interrupt is present, the group counter 1106 updates the multiplexer select signals 1133 after a delay appropriate to process the active interrupt.

Figure 12:
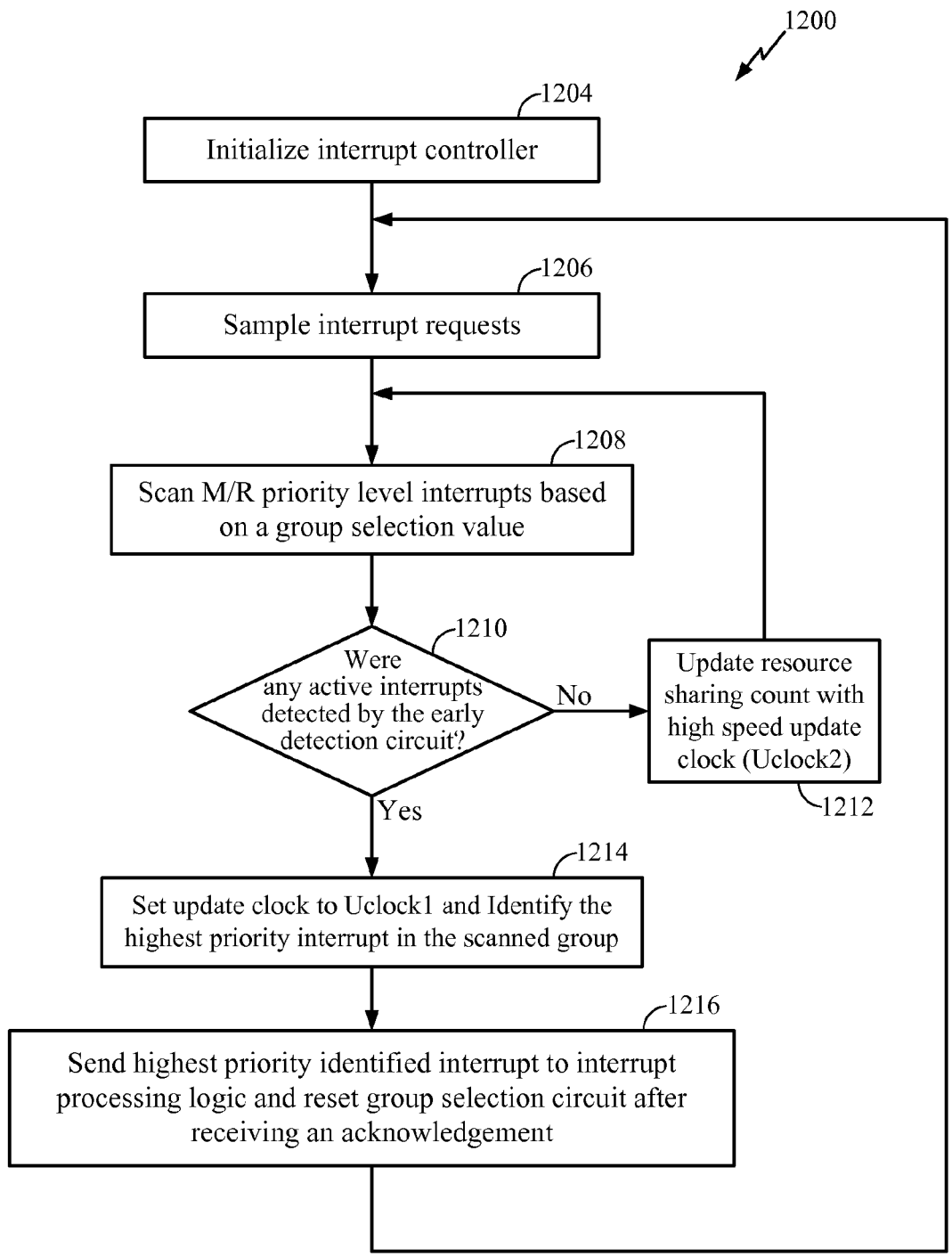
FIG. 12 illustrates an exemplary third interrupt process for operating a programmable interrupt controller in a fourth operating mode for a reduced latency interrupt controller.

FIG. 12 illustrates an exemplary third interrupt process 1200 for operating a programmable interrupt controller in a fourth operating mode for a reduced latency interrupt controller. At block 1204, the interrupt controller is initialized, which may include, resetting a group counter, such as group counter 1106, to an initial count value representing the highest priority group of priority levels. The initialization may also include loading the configuration registers to map interrupts to priority levels. At block 1206, interrupt requests are sampled. At block 1208, a number of priority levels M divided by resource sharing factor R (M/R) priority level interrupts are scanned based on a group selection value, for example, from the group counter. At decision block 1210, a determination is made whether any active interrupts were found. If no active interrupts were identified in the M/R scanned group, the third interrupt process 1200 proceeds to block 1212. At block 1212, the group counter is updated to the next count value by use of high speed clock Uclock2 to advantageously reduce the latency when no active interrupt requests have been sampled. The third interrupt process 1200 then proceeds to block 1208 to scan the next M/R group of priority level interrupts. If active interrupts were identified at decision block 1210, the third interrupt process 1200 proceeds to block 1214. At block 1214, if the update clock was previously set to Uclock2 at block 1212, then the update clock is set back to Uclock1 to provide sufficient time to process an identified interrupt. Also at block1214, the highest priority interrupt is identified in the scanned group of M/R priority level interrupts. At block 1216, the highest priority identified interrupt is sent to interrupt processing logic, acknowledged, and the group selection circuit is reset. For example, the group counter 1106 is reset to the initial count value. The third interrupt process 1200 proceeds to block 1206 to sample the incoming interrupt requests with any previously sampled lower priority interrupt requests kept pending. Further, a process to preclude interrupt starvation or loss of any pending interrupts may also be included in the third interrupt process 1200.

Figure 13:
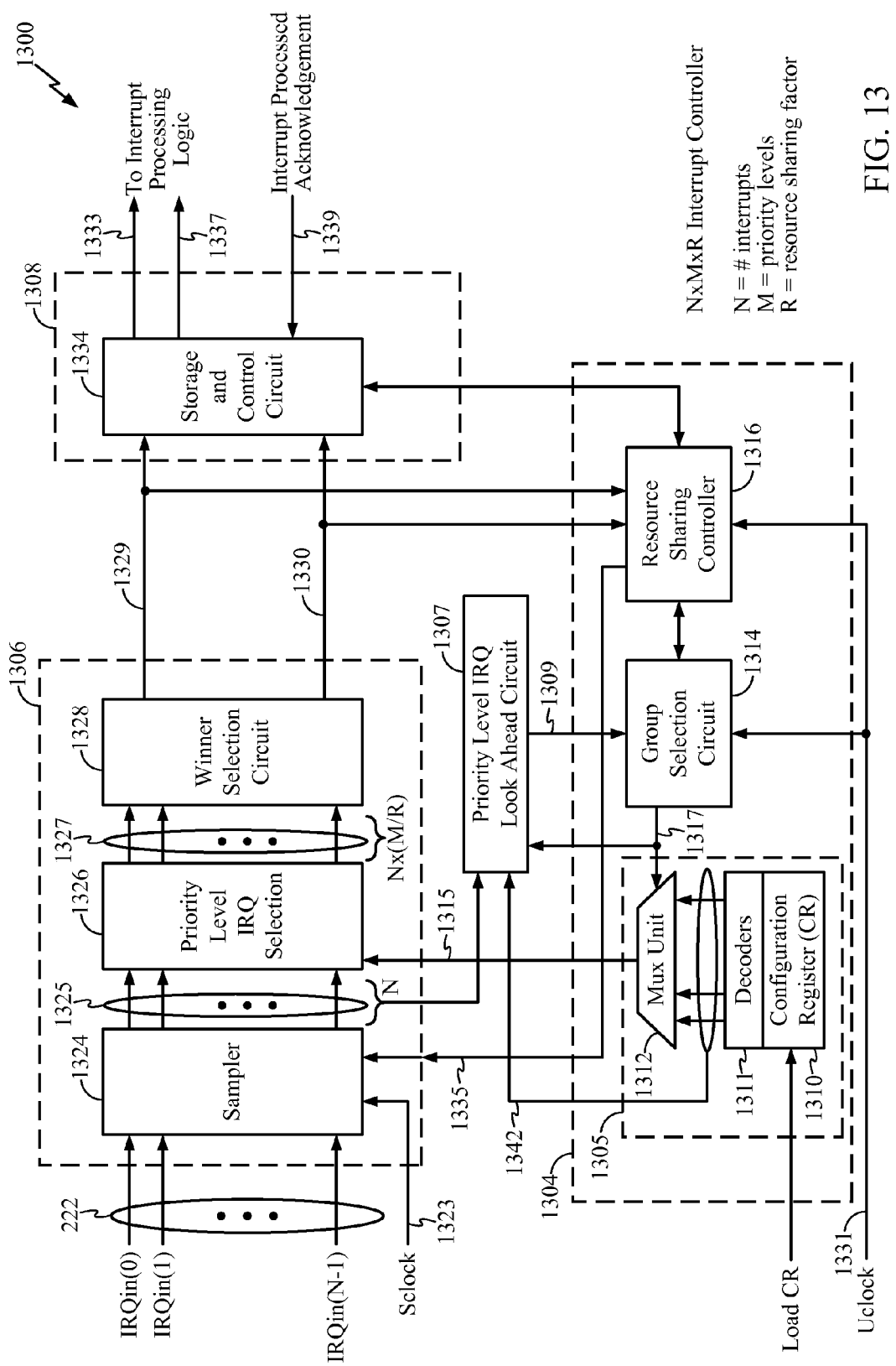
FIG. 13 illustrates a second exemplary N×M×R programmable interrupt controller (PIC) 1300 with N interrupts, M priority levels, and a resource sharing factor R operating in a fourth operating mode for a reduced latency interrupt controller.

FIG. 13 illustrates a second exemplary N×M×R programmable interrupt controller (PIC) 1300 with N interrupts, M priority levels, and a resource sharing factor R operating in a fourth operating mode for a reduced latency interrupt controller. The N×M×R PIC circuit 1300 comprises an interrupt controller and control register (ICCR) unit 1304, a winning interrupt searcher 1306, a priority level IRQ look ahead circuit 1307, and an output selection unit 1308. The ICCR unit 1304 comprises a priority level to interrupt request mapping unit 1305 having, for example, a configuration register (CR) 1310, decoders 1311, and a multiplexer (Mux) unit 1312, a group selection circuit 1314, and a resource sharing controller 1316. The winning interrupt searcher 1306 comprises a sampler 1324, a priority level IRQ selection unit 1326, and a winner selection circuit 1328. The output selection unit 1308 comprises a storage and control circuit 1334. The N×M×R PIC circuit 1300 may be programmed by loading the CR 1310 with data values that assign each of the N interrupts, IRQin (N-1:0) 222, with one of the priority levels M, with M=0 being the highest priority and M-1 being the lowest priority.

In operation, the IRQin(N-1:0) signals 222 are adaptively sampled and stored in the sampler 1324 as up to N pending interrupts. The sample clock 1323 may be a gated clock or a controlled sampling signal as described in more detail below. The sampler 1324 outputs N sampled IRQ signals 1325 which are coupled to the priority level IRQ selection unit 1326 and to the look ahead circuit 1307. Encoded data values stored in the CR 310 are decoded by decoders 311 whose output signals are coupled to the Mux unit 312. The Mux unit 312 produces N*(M/R) enable signals 315 that are used to control the priority level IRQ selection unit 326 to select interrupts, for example, in groups of one or more priority levels to produce prioritized and selected pending interrupts 327. The Mux unit 312 selects output signals of the decoders 311 to produce up to N*(M/R) enable signals 315 in response to a group selection output 317 provided from the group selection circuit 314

The look ahead circuit 1307 examines the N sampled IRQ signals 1325 for active IRQs. If an active IRQ is detected, the look ahead circuit 1307 outputs an active prioritized group signal 1309 which identifies the highest priority group having the active interrupt request. The group selection circuit 1314 in response to the active prioritized group signal 1309 provides a group selection output 1317 to multiplexers in mux unit 1312 to provide enable signals 315 for at least the identified group having the active interrupt request. By use of the priority level IRQ look ahead circuit 1307, the N sampled IRQ signals 325 are advantageously scanned within groups that have active interrupt requests thereby skipping scanning operations on groups without active interrupt requests.

Figure 14:
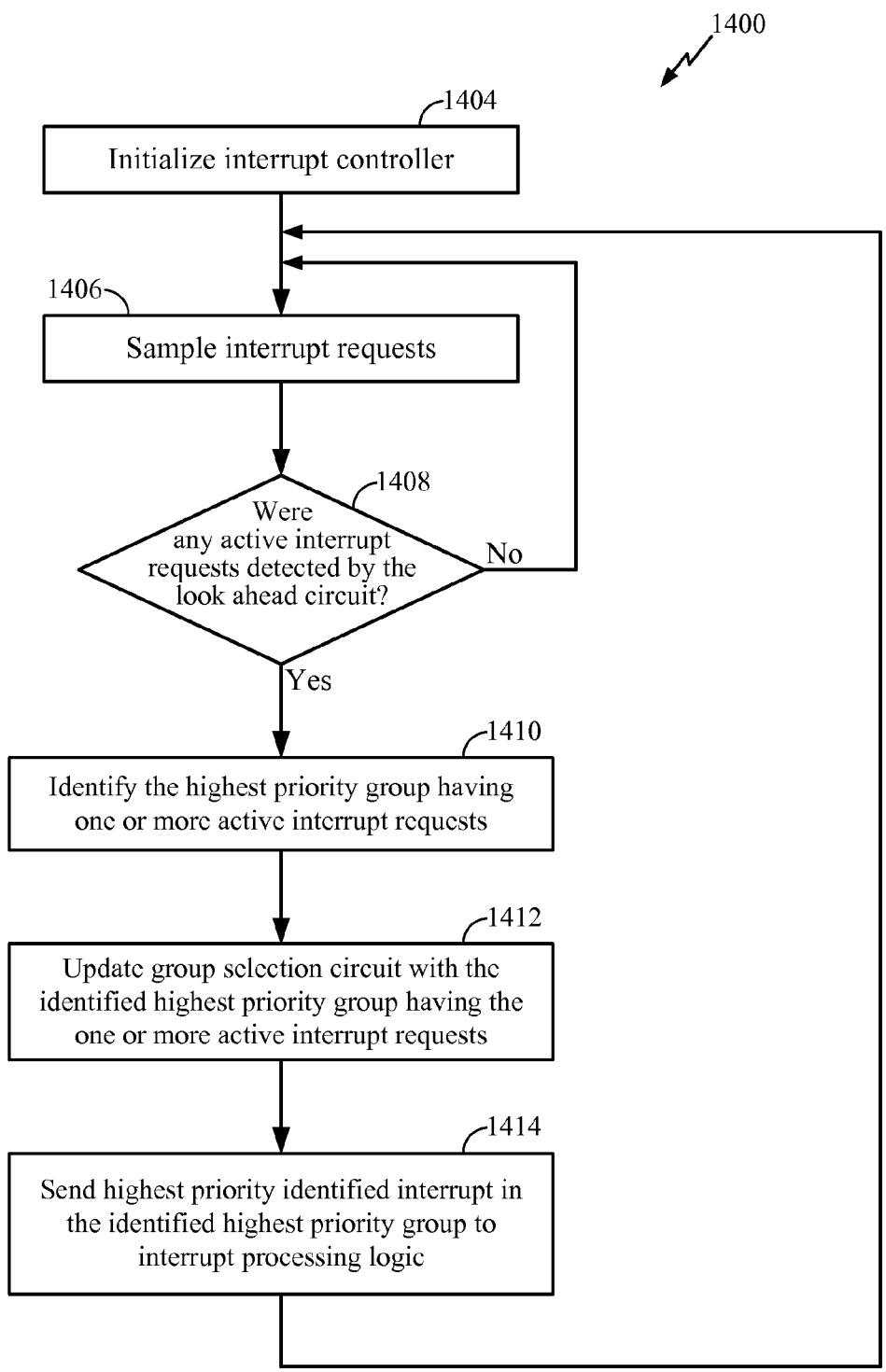
FIG. 14 illustrates an exemplary fourth interrupt process for operating a programmable interrupt controller in a fifth operating mode for a reduced latency interrupt controller.

FIG. 14 illustrates an exemplary fourth interrupt process 1400 for operating a programmable interrupt controller in a fifth operating mode for a reduced latency interrupt controller. At block 1404, the interrupt controller is initialized, which may include, resetting a group counter, such as group selection circuit 1307, to an initial count value representing the highest priority group of priority levels. The initialization may also include loading the configuration registers to map interrupts to priority levels. At block 1406, interrupt requests are sampled. At decision block 1408, a determination is made whether any active interrupts were detected by the look ahead circuit, such as priority level IRQ look ahead circuit 1307. If no active interrupts were identified, the fourth interrupt process 1400 proceeds to block 1406 where the interrupt requests are sampled. If one or more active interrupts were identified at decision block 1408, the interrupt process 1400 proceeds to block 1410. At block 1410, the highest priority group having the one more active interrupts is identified. At block 1412, a group selection circuit, such as the group selection circuit 1314 is updated with the identified highest priority group having the one or more active interrupt requests. At block 1414, the highest priority identified interrupt in the identified highest priority group is sent to interrupt processing logic. With proper buffering, such as by using a first-in-first-out (FIFO) at the interface to the interrupt processing logic, multiple interrupt requests may be identified in priority order for presentation to the interrupt processing logic. The fourth interrupt process 1400 proceeds to block 1406 where the interrupt requests are sampled with any previously sampled lower priority interrupt requests kept pending. Further, a process to preclude interrupt starvation or loss of any pending interrupts may also be included in the fourth interrupt process 1400.

By extension, large systems may be handled by the advantageous techniques of the present invention. For example, a system with N=1,024 interrupts, M=256 priority levels, and a resource sharing factor R of four may advantageously extend the techniques illustrated by the N×M×R programmable interrupt controller circuit 300. By comparison, a programmable interrupt controller with no resource sharing would require M resource sharing circuits and M priority level winner selection circuits instead of M/R resource sharing circuits and M/R priority level winner selection circuits. Such savings provide an advantageous reduction in implementation area, even when considering the added cost for resource sharing circuitry. As shown with the prioritized interrupt selection circuit 400, this added cost may be of minimum expense as long as system requirements may be met by such a design. With the techniques for reduced latency interrupt handling and reduced power utilization, considerable flexibility and system benefits may be obtained. It is further noted that the prioritized interrupt selection circuit 500 may be considered a superset of the prioritized interrupt selection circuit 400. By appropriate mapping of interrupts or by redesign of muxes $530_0$-$530_{N-1}$ and $531_0$-$531_{N-1}$, another embodiment of the prioritized interrupt selection circuit 500 may be utilized to emulate the operation of the prioritized interrupt selection circuit 400. In this manner, larger resource sharing interrupt controllers may emulate smaller resource sharing interrupt controllers as a sixth mode of operation, providing another degree of flexibility and support for legacy design operations.

The various illustrative logical blocks, modules, circuits, elements, or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in a computer readable medium, such as, RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. A software module residing in a computer readable medium when executed by a processor may, for example, program the operating mode of the N×M×R PIC 300 of FIG. 3, the set of configuration registers 310 to assign sampled interrupt requests to priority levels, and the resource sharing factor R.

While the invention is disclosed in the context of illustrative embodiments, it will be recognized that a wide variety of implementations may be employed by persons of ordinary skill in the art consistent with the above discussion and the claims which follow below.

What is claimed is:

1. A method to identify active interrupt requests, the method comprising:
   scanning a group of interrupt requests selected by a group selection circuit to identify an active interrupt request in any scanned group; and
   updating the group selection circuit to a new group, wherein the group of interrupt requests is a group of M/R priority levels of interrupt requests;
   wherein M is a number of priority levels and R is a resource sharing factor, and wherein R>1;
   wherein the group selection circuit is a counter which produces count values that represent different groups of interrupt requests.

2. The method of claim 1 further comprising:
   updating the counter at a rate that is R times a frequency of sampling the interrupt requests, wherein the interrupt requests are sampled interrupt requests and groups of interrupt requests are M/R priority levels of sampled interrupt requests, M is a number of priority levels, and R is a resource sharing factor.

3. The method of claim 1 further comprising:
   programming a set of configuration registers to assign the interrupt requests to a priority level.

4. A method to identify active interrupt requests, the method comprising:
   scanning a group of interrupt requests selected by a group selection circuit to identify an active interrupt request in any scanned group;
   updating the group selection circuit to a new group, wherein the group of interrupt requests is a group of M/R priority levels of interrupt requests;
   wherein M is a number of priority levels and R is a resource sharing factor, and wherein R>1;
   clearing the identified active interrupt request; and
   resetting the group selection circuit in response to identifying a pending interrupt request in any scanned group.

5. A method to identify active interrupt requests, the method comprising:
   scanning a group of interrupt requests selected by a group selection circuit to identify an active interrupt request in any scanned group; and
   updating the group selection circuit to a new group, wherein the group of interrupt requests is a group of M/R priority levels of interrupt requests;
   wherein M is a number of priority levels and R is a resource sharing factor, and wherein R>1;
   stopping the group selection circuit until a next interrupt request sample point has been reached.

6. An apparatus, comprising:
   means for scanning a group of interrupt requests selected by a group selection circuit to identify an active interrupt request in any scanned group; and
   means for updating the group selection circuit to a new group, wherein the group of interrupt requests is a group of M/R priority levels of interrupt requests, wherein M is a number of priority levels and R is a resource sharing factor, and wherein R>1;
   wherein the means for scanning a group of interrupt requests selected by a group selection circuit includes a counter which produces count values that represent different groups of interrupt requests.

7. The apparatus of claim 6, further comprising:
   means for updating the counter at a rate that is R times a frequency of sampling the interrupt requests, wherein the interrupt requests are sampled interrupt requests and groups of interrupt requests are M/R priority levels of sampled interrupt requests, M is a number of priority levels, and R is a resource sharing factor.

8. The apparatus of claim 6, further comprising:
   means for programming a set of configuration registers to assign the interrupt requests to a priority level.

9. An apparatus comprising:
   means for scanning a group of interrupt requests selected by a group selection circuit to identify an active interrupt request in any scanned group;
   means for updating the group selection circuit to a new group, wherein the group of interrupt requests is a group of M/R priority levels of interrupt requests, wherein M is a number of priority levels and R is a resource sharing factor, and wherein R>1;
   means for clearing the identified active interrupt request; and
   means for resetting the group selection circuit in response to identifying a pending interrupt request in any scanned group.

10. An apparatus comprising:
    means for scanning a group of interrupt requests selected by a group selection circuit to identify an active interrupt request in any scanned group;
    means for updating the group selection circuit to a new group, wherein the group of interrupt requests is a group of M/R priority levels of interrupt requests, wherein M is a number of priority levels and R is a resource sharing factor, and wherein R>1;
    means for stopping the group selection circuit until a next interrupt request sample point has been reached.

11. A machine readable medium comprising instructions for resource sharing, wherein the instructions upon execution cause a machine to:
    scan a group of interrupt requests selected by a group selection circuit to identify an active interrupt request in any scanned group; and
    update the group selection circuit to a new group, wherein the group of interrupt requests is a group of M/R priority levels of interrupt requests, wherein M is a number of priority levels and R is a resource sharing factor, and wherein R>1;
    wherein the group selection circuit is a counter which produces count values that represent different groups of interrupt requests.

12. The machine readable medium of claim 11, wherein the instruction upon execution further comprise causing a machine to:
    update the counter at a rate that is R times a frequency of sampling the interrupt requests, wherein the interrupt requests are sampled interrupt requests and groups of interrupt requests are M/R priority levels of sampled interrupt requests, M is a number of priority levels, and R is a resource sharing factor.

13. The machine readable medium of claim 11, wherein the instructions upon execution further comprises causing a machine to:
    program a set of configuration registers to assign the interrupt requests to a priority level.

14. A machine readable medium comprising instructions for resource sharing, wherein the instructions upon execution cause a machine to:
    scan a group of interrupt requests selected by a group selection circuit to identify an active interrupt request in any scanned group;
    update the group selection circuit to a new group, wherein the group of interrupt requests is a group of M/R priority levels of interrupt requests, wherein M is a number of priority levels and R is a resource sharing factor, and wherein R>1;

clear the identified active interrupt request; and reset the group selection circuit in response to identifying a pending interrupt request in any scanned group.

15. A machine readable medium comprising instructions for resource sharing, wherein the instructions upon execution cause a machine to:

scan a group of interrupt requests selected by a group selection circuit to identify an active interrupt request in any scanned group;

update the group selection circuit to a new group, wherein the group of interrupt requests is a group of M/R priority levels of interrupt requests, wherein M is a number of priority levels and R is a resource sharing factor, and wherein R>1;

stop the group selection circuit until a next interrupt request sample point has been reached.

16. An apparatus for selecting interrupt requests comprising:

a group selection circuit for scanning a group of interrupt requests to identify an active interrupt request in any scanned group;

an updating circuit for updating the group selection to a new group, wherein the group of interrupt requests is a group of M/R priority levels of interrupt requests, wherein M is a number of priority levels and R is a resource sharing factor, and wherein R>1;

wherein the group selection circuit is a counter which produces count values that represent different groups of interrupt requests.

17. The apparatus of claim 16, further comprising:

a counter updating circuit for updating the counter at a rate that is R times a frequency of sampling the interrupt requests, wherein the interrupt requests are sampled interrupt requests and groups of interrupt requests are M/R priority levels of sampled interrupt requests, M is a number of priority levels, and R is a resource sharing factor.

18. The apparatus of claim 16 further comprising:

an assigning circuit for programming a set of configuration registers to assign the interrupt requests to a priority level.

19. An apparatus for selecting interrupt requests comprising:

a group selection circuit for scanning a group of interrupt requests to identify an active interrupt request in any scanned group;

an updating circuit for updating the group selection to a new group, wherein the group of interrupt requests is a group of M/R priority levels of interrupt requests, wherein M is a number of priority levels and R is a resource sharing factor, and wherein R>1;

a clearing circuit for clearing the identified active interrupt request; and a group selection circuit for resetting the group selection in response to identifying a pending interrupt request in any scanned group.

20. An apparatus for selecting interrupt requests comprising:

a group selection circuit for scanning a group of interrupt requests to identify an active interrupt request in any scanned group;

an updating circuit for updating the group selection to a new group, wherein the group of interrupt requests is a group of M/R priority levels of interrupt requests, wherein M is a number of priority levels and R is a resource sharing factor, and wherein R>1;

wherein the group selection circuit is stopped until a next interrupt request sample point has been reached.

* * * * *